(12) United States Patent
Guillemette et al.

(10) Patent No.: US 12,403,641 B2
(45) Date of Patent: Sep. 2, 2025

(54) METHOD AND APPARATUS FOR FORMING HIGH STRENGTH PRODUCTS

(71) Applicant: Guill Tool & Engineering Co., Inc., West Warwick, RI (US)

(72) Inventors: Richard Roy Guillemette, West Warwick, RI (US); Robert Peters, West Warwick, RI (US); Christopher J Hummel, Providence, RI (US)

(73) Assignee: Guill Tool & Engineering Co., Inc., West Warwick, RI (US)

(*) Notice: Subject to any disclaimer, the term of this patent is extended or adjusted under 35 U.S.C. 154(b) by 0 days.

(21) Appl. No.: 18/512,911

(22) Filed: Nov. 17, 2023

(65) Prior Publication Data

US 2024/0083084 A1 Mar. 14, 2024

Related U.S. Application Data

(63) Continuation of application No. 17/128,340, filed on Dec. 21, 2020, now Pat. No. 11,833,726, which is a
(Continued)

(51) Int. Cl.
*B32B 1/08* (2006.01)
*B29C 48/10* (2019.01)
(Continued)

(52) U.S. Cl.
CPC .............. *B29C 48/10* (2019.02); *B29C 48/19* (2019.02); *B29C 48/21* (2019.02);
(Continued)

(58) Field of Classification Search
CPC ......... B29C 48/19; B29C 48/10; B29C 48/21; B29C 48/3366; B29C 48/338; B29C 48/397; B29C 48/49; B29C 48/71; B29C 65/70; B29C 48/07; B29C 48/09; B29C 48/255; B29C 48/70; B29C 48/705; B29D 23/00; B30B 11/221; B30B 11/224; B29L 2023/001; B29L 2023/005; B32B 1/08; B32B 27/08; B32B 2597/00; F16L 11/04; F16L 11/10; Y10T 428/13; Y10T 428/1352

See application file for complete search history.

(56) References Cited

U.S. PATENT DOCUMENTS 5,078,942 A * 1/1992 Sullivan ................ B29C 48/336
264/171.27
5,620,714 A * 4/1997 Veen ..................... B29C 48/705
425/192 R
(Continued)

*Primary Examiner* — Michael C Romanowski
(74) *Attorney, Agent, or Firm* — ZIEGLER IP LAW GROUP, LLC.

(57) ABSTRACT

A system and method are presented in which a flow of plastic is extruded to obtain nano-sized features by forming multiple laminated flow streams, flowing in parallel through the non-rotating extrusion system. Each of the parallel laminated flow streams are subjected to repeated steps in which the flows are compressed, divided, and overlapped to amplify the number of laminations. The parallel amplified laminated flows are rejoined to form a combined laminated output with nano-sized features. The die exit is formed to provide a tubular shape.

12 Claims, 26 Drawing Sheets

Related U.S. Application Data continuation of application No. 15/200,172, filed on Jul. 1, 2016, now Pat. No. 10,870,230, which is a continuation of application No. 13/336,825, filed on Dec. 23, 2011, now Pat. No. 9,381,712.

(60) Provisional application No. 61/460,042, filed on Dec. 23, 2010.

(51) Int. Cl.
| | |
|---|---|
| B29C 48/19 | (2019.01) |
| B29C 48/21 | (2019.01) |
| B29C 48/335 | (2019.01) |
| B29C 48/395 | (2019.01) |
| B29C 48/49 | (2019.01) |
| B29C 48/71 | (2019.01) |
| B29C 65/70 | (2006.01) |
| B29D 23/00 | (2006.01) |
| B29L 23/00 | (2006.01) |
| B30B 11/22 | (2006.01) |
| B32B 27/08 | (2006.01) |
| B29C 48/07 | (2019.01) |
| B29C 48/09 | (2019.01) |
| B29C 48/255 | (2019.01) |
| B29C 48/70 | (2019.01) |
| F16L 11/04 | (2006.01) |
| F16L 11/10 | (2006.01) |

(52) U.S. Cl.
CPC ........ *B29C 48/3366* (2019.02); *B29C 48/338* (2019.02); *B29C 48/397* (2019.02); *B29C 48/49* (2019.02); *B29C 48/71* (2019.02); *B29C 65/70* (2013.01); *B29D 23/00* (2013.01); *B30B 11/221* (2013.01); *B30B 11/224* (2013.01); *B32B 1/08* (2013.01); *B32B 27/08* (2013.01); *B29C 48/07* (2019.02); *B29C 48/09* (2019.02); *B29C 48/255* (2019.02); *B29C 48/70* (2019.02); *B29C 48/705* (2019.02); *B29L 2023/001* (2013.01); *B29L 2023/005* (2013.01); *B32B 2597/00* (2013.01); *F16L 11/04* (2013.01); *F16L 11/10* (2013.01); *Y10T 428/13* (2015.01); *Y10T 428/1352* (2015.01)

(56) References Cited

U.S. PATENT DOCUMENTS

| | | | |
|---|---|---|---|
| 6,533,565 B1* | 3/2003 | Guillemette | B29C 48/705 425/465 |
| 6,669,458 B2* | 12/2003 | Guillemette | B29C 48/09 425/382.3 |
| 7,105,117 B2* | 9/2006 | Rodgers | B29C 48/022 264/105 |
| 2004/0037986 A1* | 2/2004 | Houston | A61F 2/844 428/36.9 |
| 2010/0098126 A1* | 4/2010 | Singer | H01S 3/0627 264/1.7 |

* cited by examiner

METHOD AND APPARATUS FOR FORMING HIGH STRENGTH PRODUCTS

CROSS-REFERENCE TO RELATED APPLICATIONS

This application is a continuation of U.S. patent application Ser. No. 17/128,340, filed on Dec. 21, 2020 which is a continuation of U.S. patent application Ser. No. 15/200,172, filed on Jul. 1, 2016, now U.S. Pat. No. 10,870,230 which is a continuation of U.S. patent application Ser. No. 13/336,825, filed on Dec. 23, 2011, now U.S. Pat. No. 9,381,712 which claims priority to, and the benefit of, U.S. Provisional Patent Application Ser. No. 61/460,042, filed on Dec. 23, 2010, the disclosures of which are incorporated herein by reference in their entirety.

BACKGROUND

1. Field

The aspects of the present disclosure generally relate to extrusion die systems. In particular, the aspects of the present disclosure relate to the cyclical extrusion of materials to generate small sized grain features, generally in the range of micro and nanosized grain features to improve the strength of extruded products.

2. Brief Description of Related Developments

Nanostructured materials are generally regarded as materials having very small grain feature size, typically in the range of approximately 1-100 nanometers (10-9 meters). Metals, ceramics, polymeric and composite materials may be processed in a variety of ways to form nanosized features. These materials have the potential for wide ranging applications, including for example, industrial, biomedical and electronic applications. As a result, a great deal of study is ongoing to gain a better understanding of the characteristics of these materials.

Conventional extrusion formed products are limited to approximately twelve layers. Micro-layer extrusion processes can extend these limitations. A micro-layer extrusion process that provides a method for obtaining small grain features is described in U.S. Pat. No. 7,690,908, (the "'908 patent") commonly owned by the assignee of the instant application, the disclosure of which is incorporated herein by reference in its entirety. The disclosure of the '908 patent describes a system of dies that are constructed to adapt extrusion technology. Examples of such extrusion technology are described in U.S. Pat. Nos. 6,669,458, 6,533,565 and 6,945,764, commonly owned by the assignee of the instant application.

The typical micro-layer product is formed in a sheet. If a tubular product is desired, the microlayer is first formed into a sheet and then made into the tube. This creates a weld line or separation between the microlayers. The '908 patent describes a cyclical extrusion of materials by dividing, overlapping and laminating layers of flowing material, multiplying the flow and further dividing, overlapping and laminating the material flow to generate small grain features and improve properties of the formed product. Examples of the improved properties include, but are not limited to burst strength, tensile strength, tear resistance, barrier and optical properties. Referring to FIGS. 1 and 2, a series of die plates 100 are configured to receive a flow of material, such as plastic or other suitable material, at 101. The first distribution module 110 divides the flow into multiple capillary streams and distributes the flow downstream to a transition module 111. The transition module 111 further divides the streams and transforms the shape of the generally circular capillary streams into thin ribbon like streams. At the exit of the transition module 111 the flow cross sectional area of each ribbon stream may be reduced by a compression of the flowing material. At the output of the transition module 111, sets of adjacent ribbons (a pair as shown) are directed to a first compression stage in die plate 6 of compression/layering module 112. Each set of ribbon pairs is processed into a layered flow. This layered flow comprises a laminate of the sets of adjacent ribbons. The first stage compression die plate 6 also splits the laminated ribbons into at least a pair of adjacent ribbons. At this stage, the original plastic flow is considerably altered and now comprises at least side by side, multiple parallel flows in the form of laminated ribbons.

As shown in FIGS. 1 and 2, each of these flows are subjected to a series of cycles in which the ribbons are compressed, divided and overlapped to multiply the number of laminations. In one embodiment, this cycle is repeated in a chain of extrusion stages of this construction, resulting in increasing numbers of thinner laminations formed within the extrusion flow. In the case of dual side by side flows, the number of laminations would be doubled at each stage.

By first distributing the flowing plastic into a set of multiple streams and then combining the multiple streams into a series of laminated streams, a group of parallel streams, oriented above and below, as shown in FIG. 1, may be processed in parallel and rejoined to generate combined flow stream. At the die system exit, generally shown at 106, a laminated plastic flow is achieved having a significantly high number of thin laminations in which micro and nano-sized features may be formed. By controlling the number of compression, division, and lamination cycles, the thickness of the laminations may be adjusted. As described in the '908 patent, it is advantageous that a basic die system include dividing the stream into at least a pair of flow streams to take full advantage of multiple cycles of compression, dividing and layering. In the '908 patent, multiple pairs of flow streams are stacked in a parallel relationship.

The '908 patent relies on the cyclical extrusion of materials. The output plastic flow, also referred to as the rejoined flow, is applied to final die elements 120 that wind the laminated plastic flow into a tubular end product having nano-sized features. U.S. Pat. No. 6,669,458, ("the '458 patent"), commonly owned by the assignee of the instant application and the disclosure of which is incorporated herein by reference in its entirety, discloses one embodiment of an extrusion die with rotating components. Referring to FIG. 3, a cross-sectional view of an extrusion die having balanced flow passages and rotating elements is illustrated.

The extrusion system 150, shown in FIG. 3 is configured to extrude a tubular product constructed of common thermoplastic materials. The system 150 includes an extruder 152 designed to provide a molten material, such as plastic, to an extrusion die 153. The extrusion die 153 consists of a series of components including a die body 154, and a die module 156. When assembled, the extrusion die 153 of these components is constructed having a passage 157 therein extending from an upstream inlet 158 to a downstream outlet 159. The passage 157 is formed by the cooperation of adjacent components and the individual components of the passage communicate to provide a continuous passage 157 for the flow of molten plastic through the extrusion die 153. This passage is constructed to provide a balanced flow of plastic to and throughout an extrusion channel 23 which is formed downstream as described below.

Flow channel(s) 161 are connected to inlet 158 and a divider 162 separates the incoming stream of plastic evenly into the two channels. Flow channels 161 are constructed in the die body 154 and extend through the die body 154 to respective outlets (not shown), in the transversely oriented downstream face 165 of the die body 154. A distribution groove 166 is formed in the downstream face 165 between an upstream edge and a downstream edge. The distribution groove 166 communicates with the outlets to receive molten plastic from the flow channels 151. The distribution groove 166 is substantially semicircular in cross section and extends in an annular manner concentric with the axis 24 of the extrusion die 3. The flow of plastic will be around the distribution groove 166 from each of the outlets. The flow will be in two opposing paths within the groove 166.

The die body 154 and die module 156 are constructed with axially extending bores 25 and 26 respectively which align to form a continuous opening along the axis 24 of the extrusion die 153. A tip module 155 is constructed to fit within the bore 25/26. A clearance is formed between the inner surface of the bore 26, and the outer surface of the tip 155 to form the extrusion channel portion 23 and the exit portion 27 of the plastic passage 157. A conical surface 22 is constructed on the outer surface of the tip module 155 and cooperates with a conical portion of the bore 26 to form the tapered extrusion channel 23. The tip 155 may be constructed with an axial bore 30 to allow an elongated element to pass through the die for coating. The '458 patent provides for relative rotational movement between the surfaces 28 and 29.

A rotary die assembly requires specialized parts and configurations to accommodate the rotating surfaces as well as the high temperatures involved in these processes. It would be advantageous to be able create a tubular product using an extrusion system with or without the need for rotating components.

All tubular products made by an extrusion die possess a knit or weld line due to the supports required for the tip or mandrel in the dies center. A rotary die twists the polymer, so the knit lines get mixed into a seamless product, potentially eliminating the weld line and making the tube stronger. The tube also spins when it exits the die, which can create a helical appearance i.e. addition of stripes. The spinning tube can also be utilized to aid in a coating process.

Accordingly, it would be desirable to provide a system that addresses at least some of the problems identified above.

BRIEF DESCRIPTION OF THE ASPECTS OF THE PRESENT DISCLOSURE

As described herein, the exemplary embodiments overcome one or more of the above or other disadvantages known in the art.

One aspect of the exemplary embodiments relates to a method. In one embodiment, the method includes extruding a flow of extrusion material in a non-rotating extrusion assembly, forming a first set of multiple laminated flow streams from the extruded flow, amplifying a number of the laminations by repeatedly compressing, dividing and overlapping the multiple laminated flow streams, rejoining the parallel amplified laminated flows, forming a first combined laminate output with nano-sized features from the rejoining; and forming a tubular shaped micro-layer product from the combined laminate output.

Another aspect of the exemplary embodiments relates to an apparatus. In one embodiment, the apparatus includes a non-rotating micro-layer extrusion assembly. In one embodiment, the assembly includes an extrusion material distribution system, at least one multiple laminate flow passage configured to amplify a number of laminations of each flow stream by repeatedly compressing, dividing and overlapping each of the multiple laminate flow streams, and an exit die having an exit flow passage coupled to the multiple laminate flow passage, the exit die configured to generate an inner and an outer annular segment for the multiple laminate flow stream and wherein the exit flow passage is skewed from a parallel direction of the flow stream at a pre-determined helical pitch angle relative to a central axis of the non-rotating extrusion assembly.

A further aspect of the disclosed embodiments relates to a micro-layer tubular extrusion product. In one embodiment the product comprises at least one micro-layer having nano-sized features. The at least one micro-layer is formed by receiving a flow of extrudible material in non-rotating micro-layer extrusion assembly, constructing a series of ribbon shaped flow streams, subjecting the ribbon shaped flow streams to multiple sequences of stages, wherein, in each of the sequences the flow streams are compressed. In one embodiment, the sequences further include joining sets of the series of ribbon shaped flow streams to form multiple laminated flow streams flowing in parallel, dividing each of the multiple parallel laminated flow streams into at least two adjacent flow streams while compressing the resulting flow streams to form thinner laminations, overlapping the adjacent flow streams to form a flow stream, thereby multiplying the number of laminations, repeating the dividing and overlapping steps in parallel for each of the multiple parallel laminated flow streams to multiply the number of laminations and to generate progressively thinner laminations until nano-sized features are obtained, providing an output flow stream from the multiple sequences of stages, the output flow stream comprising an inner and outer annular segment, and bonding adjacent ends of the inner and outer annular segments together to form the tubular micro-layer product.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and unless otherwise indicated, they are merely intended to conceptually illustrate the structures and procedures described herein. In addition, any suitable size, shape or type of elements or materials could be used.

DETAILED DESCRIPTION OF THE PRESENT DISCLOSURE

Figure 4:
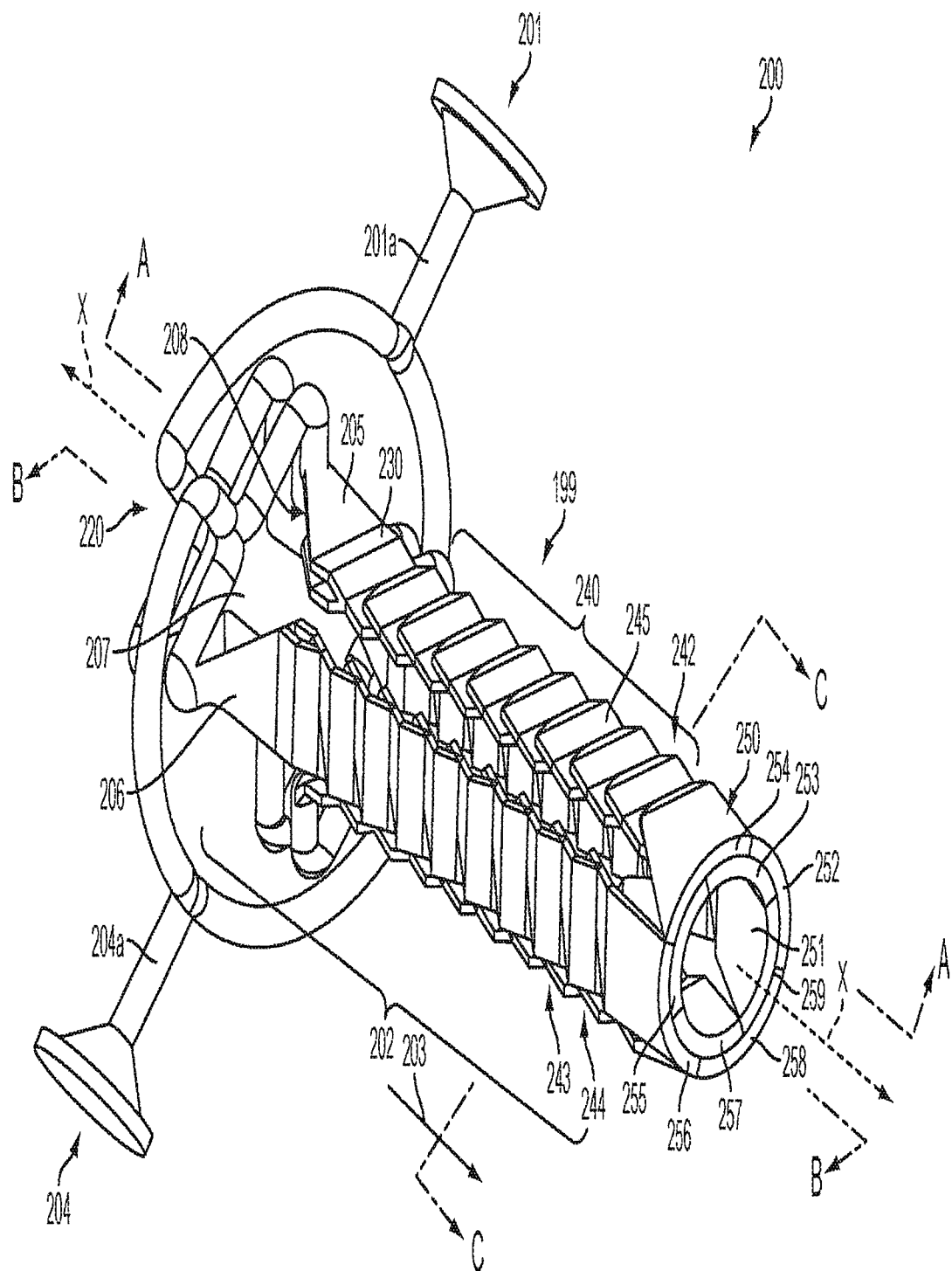
FIG. 4 is a perspective view of an extrusion die system incorporating aspects of the disclosed embodiments.

Referring to FIG. 4, an extrusion die system incorporating aspects of the present disclosure is generally designated by reference numeral 200. The aspects of the present disclosure are generally directed to an extrusion system for producing nano-sized features by forming multiple laminated flow streams. Although the aspects of the present disclosure will be described with reference to the embodiments shown in the drawings, it should be understood that the aspects of the present disclosure may have many alternative forms.

The aspects of the present disclosure are configured to extrude a stream of material, such as resin or plastics, into articles having an assortment of different shapes. The articles can include for example, but are not limited to, tubular or cylindrical shapes. The finished product or article will have small grain features, and in particular of a micro or nanometer size. This is accomplished for a tubular product with or without relying on the use of rotating die components.

Referring to FIG. 4, in one embodiment, the extrusion system 200 generally comprises an array 199 of die plates 202 that are configured to receive and process a flow of extrusion material, such as resin or plastic, received through or from one or more sources 201, 204 in a direction indicated by arrow 203. Although the system 200 shown in FIG. 4 illustrates two sources 201, 204, in alternate embodiments more or less than two sources can be used. Additional, each source 201, 204 can comprise a different material. Each of the die plates 202 is generally configured to generate a cumulated laminated output with nano-sized features, similar to the output generated by the system disclosed in the '908 patent. For purposes of the description herein, only the die plates 202 are shown. The sequence of die plates includes a first stage of die plates constructed to receive the flow of extrudible material and divide the flow into multiple ribbon shaped flow streams, a second stage of die plates constructed to receive the multiple ribbon shaped flow streams and further divide each of the multiple ribbon shaped flow streams into at least two ribbon shaped flow streams. The second stage of die plates is also configured to layer the two ribbon shaped flow streams into composite laminated flow streams. A third stage of die plates is configured to receive the composite laminated flow streams and to again divide each of the composite laminated flow streams into at least two ribbon shaped flow streams. The third stage of die plates is configured to layer the two ribbon shaped flow streams into composite laminated flow streams, wherein the number of laminations is multiplied and compressed.

In the embodiment illustrated in FIG. 4, the extrusion system 200 is configured to divide the flow of plastic material 201a, 204a into four (4) flow passages, also referred to as flow streams, generally indicated as 205-208. Although for the purposes of the description herein on four flow streams are illustrated, in alternate embodiments any suitable number of flow streams can be utilized, including more or less than four. For example, as will be described further herein, other embodiments are illustrated showing configurations using one, two, three, six and eight flow streams flowing in a direction generally parallel to a central axis X-X of the extrusion die system 200.

The multiple streams 205-208 of plastic flow 201a, 204a generate pairs of flow streams that are subjected to repeated cycles of compression, division, and lamination, similar to the process described in the '908 patent. In an embodiment of the present disclosure, unlike the process described in the '908 patent, the multiple streams 205-208 are not stacked immediately adjacent, as in the parallel flow streams of the '908 patent, but are rather uniquely and advantageously arranged in an array 199 with each stream flowing along an axis that is parallel, but displaced, in a plane transverse to the primary direction of flow 203.

As is shown in FIG. 4, in one embodiment, the pattern of the array 199 may be substantially rectangular with an axis of each flow stream 205-208 being displaced approximately 90 degrees in a plane transverse to the axis of an adjacent flow stream 205-208. In alternate embodiment, the array 199 can comprise any suitable geometric shape, including substantially circular, oval or square. In the embodiment of FIG. 4, the four flow streams 205-208 are arranged at approximately 90 degree intervals around the central axis X-X of the die system 200. In one embodiment, opposing pairs of flow streams, such as 205 and 207 or 206 and 208, are substantially parallel to each other. Each of the four flow streams 205-208 will be compressed, divided, and layered and then combined to form a tubular product output having multiple thin laminations at the die system exit 250.

In addition, the aspects of the present disclosure may be configured to provide an axially aligned tubular substrate onto which the laminated output of the die system 200 may be extruded. In a further embodiment an outer coating layer maybe applied to the laminated tubular output of the die system 200. Further embodiments are described in which multiple materials may be supplied to provide the laminating flow streams to enhance the strength of the laminated tubular product.

In the embodiment of FIG. 4, the extrusion die system 200 generally includes a distribution module 220, a transition module 230, a laminating module 240, and a die exit 250. In one embodiment, each set of die plates 202 includes a transition and laminating module. In alternate embodiments, the transmission module and laminating module is integrated with separate flow passages for each stream 205-208. The transition module 230 and laminating module 240 generally correspond to the transition stage 111 and laminating stage 112 of the '908 patent, the disclosure of which is incorporated herein by reference.

Figure 1:
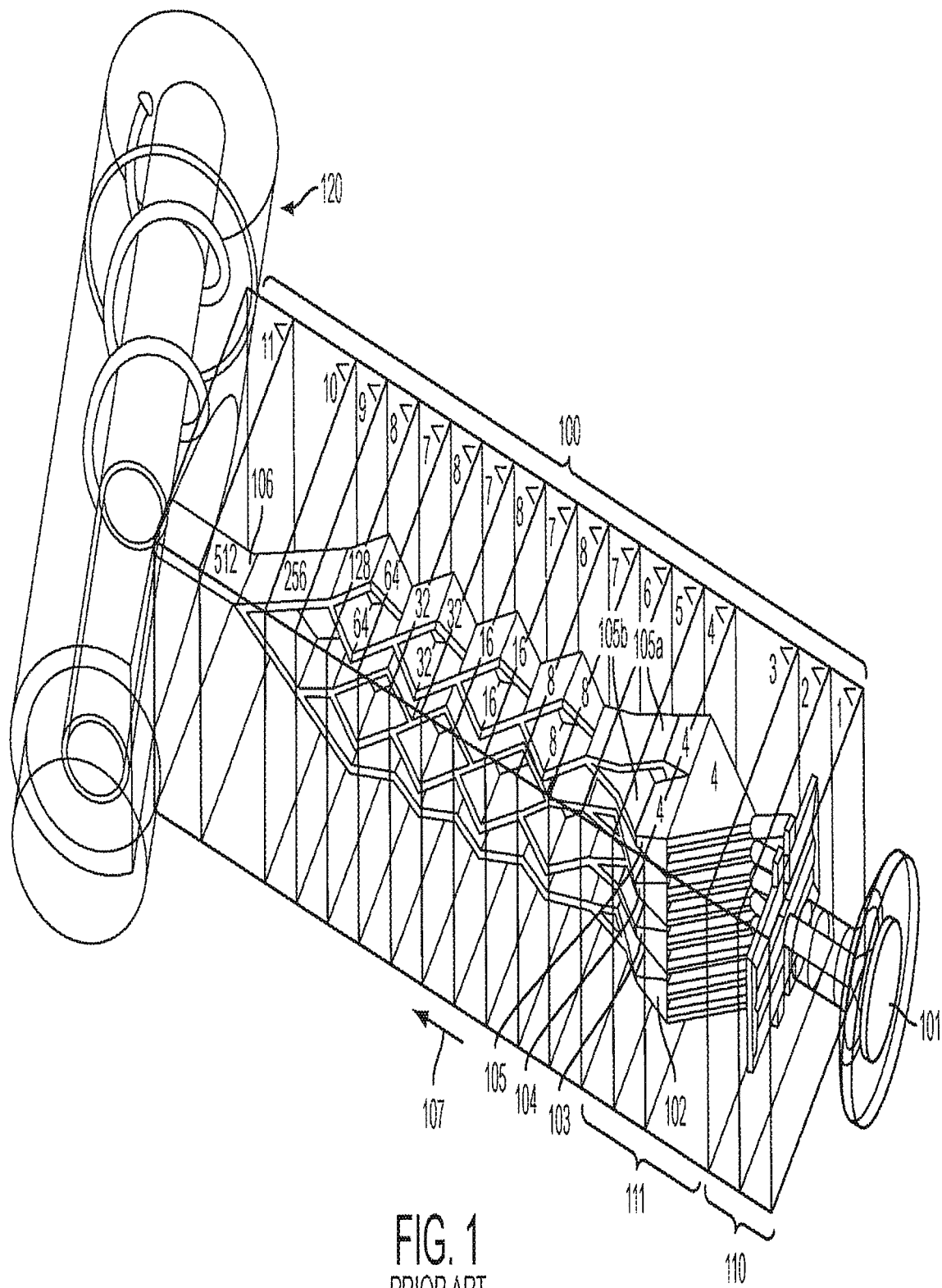
FIG. 1 is a transparent perspective view of one embodiment of an extrusion system for obtaining nano-sized features.
Figure 2:
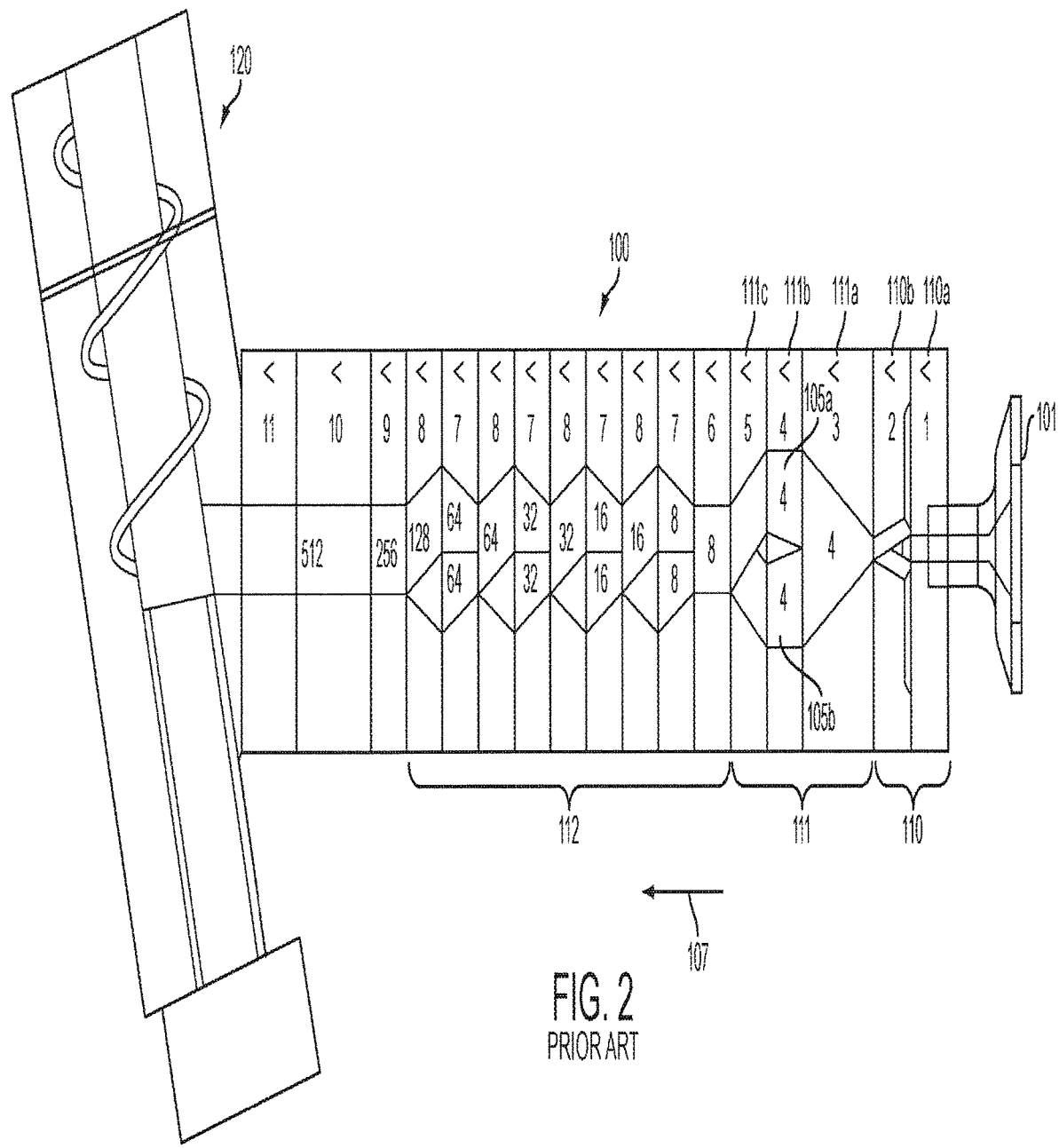
FIG. 2 is a top view of the extrusion system shown in FIG. 1.

In one embodiment, the distribution module 220 includes one or more plates, such as plates 110a and 110b shown in FIG. 2, which are configured to receive the flow(s) of material 201, 204 from a source (not shown) and divide the flow 201a, 204a of material into multiple capillary streams 205-208. The capillary streams 205-208 are passed through transmission module 230.

The transmission module 230 is generally configured to form each of the streams 205-208 into a ribbon like stream that is directed to the laminating module 240. The transmission module 230 is constructed having multiple die plates, such as plates 111a-c shown in FIG. 2, arranged in sequence to process each of the capillary streams 205-208, namely, to compress, divide, and laminate each of the flow streams 205-208, as described in more detail in the '908 patent.

As noted above, the composite flow stream 201a, 204a may be comprised of a single material from one source. Alternately, the composite flow stream 201a, 204a comprises two or more different materials from multiple sources. As shown in the embodiment of FIG. 4, two different materials, 201 and 204 are supplied to the die system 200 and distributed to each of the flow streams 205-208. For purposes of the description herein, each of the laminated flow streams 205-208 shown in this example can be comprised of a composite of the two materials 201, 204.

Figure 8:
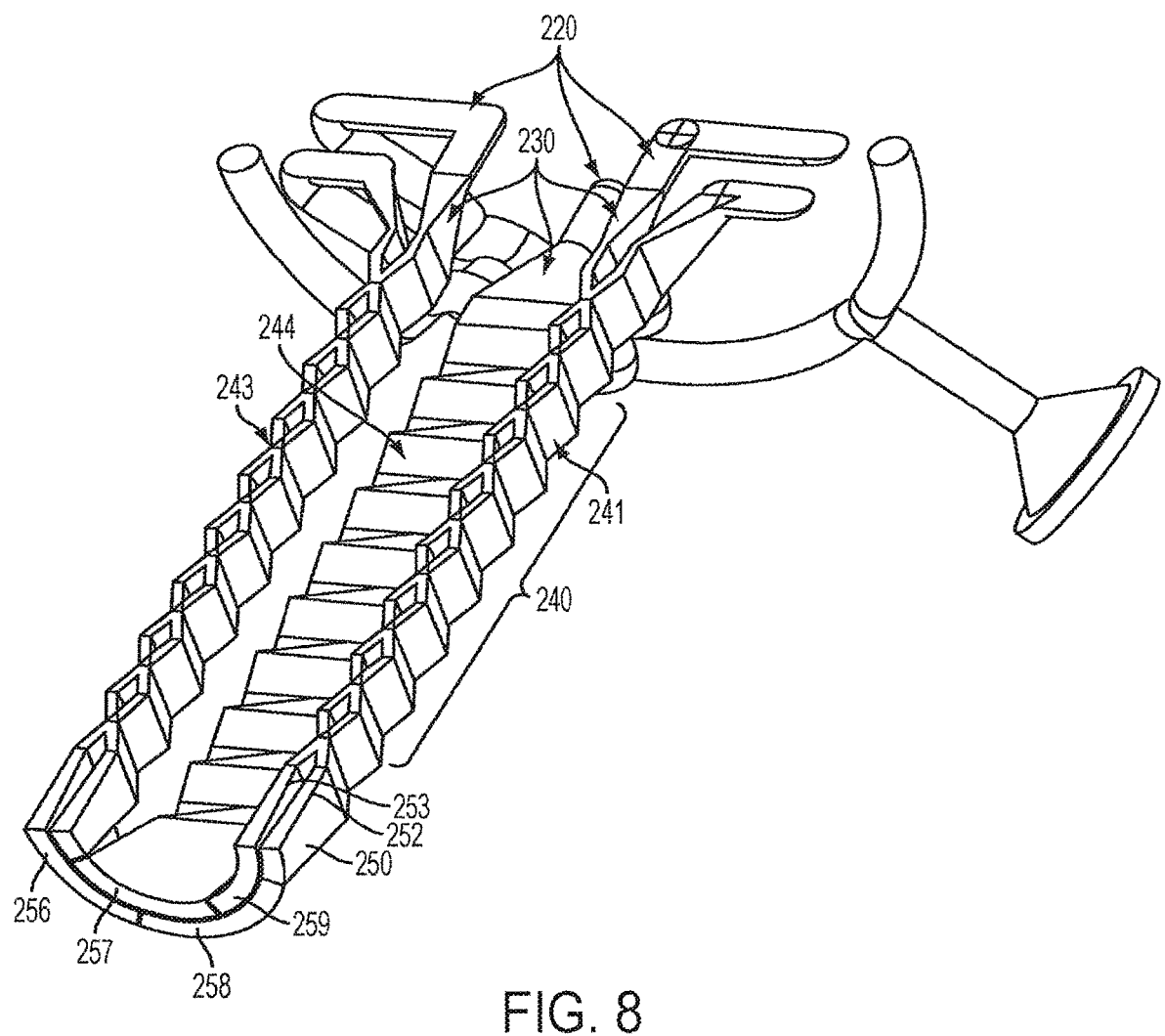
FIG. 8 is a sectional view of the embodiment of FIG. 4 taken along section lines B-B.

It should be noted that it is a purpose of this arrangement of die plates 202 is to convert each input flow 201a, 204a, into a group of parallel laminated flows 205-208, as illustrated in FIGS. 4 and 8. The number of flow streams and groups formed may depend on a variety of factors and the aspects of the present disclosure are not intended to be limited to the number of flow streams and groups shown. Multiple parallel flows are advantageous to reduce the overall length and foot print of the extrusion system 200 when nano-sized grain features are needed.

Figure 5:
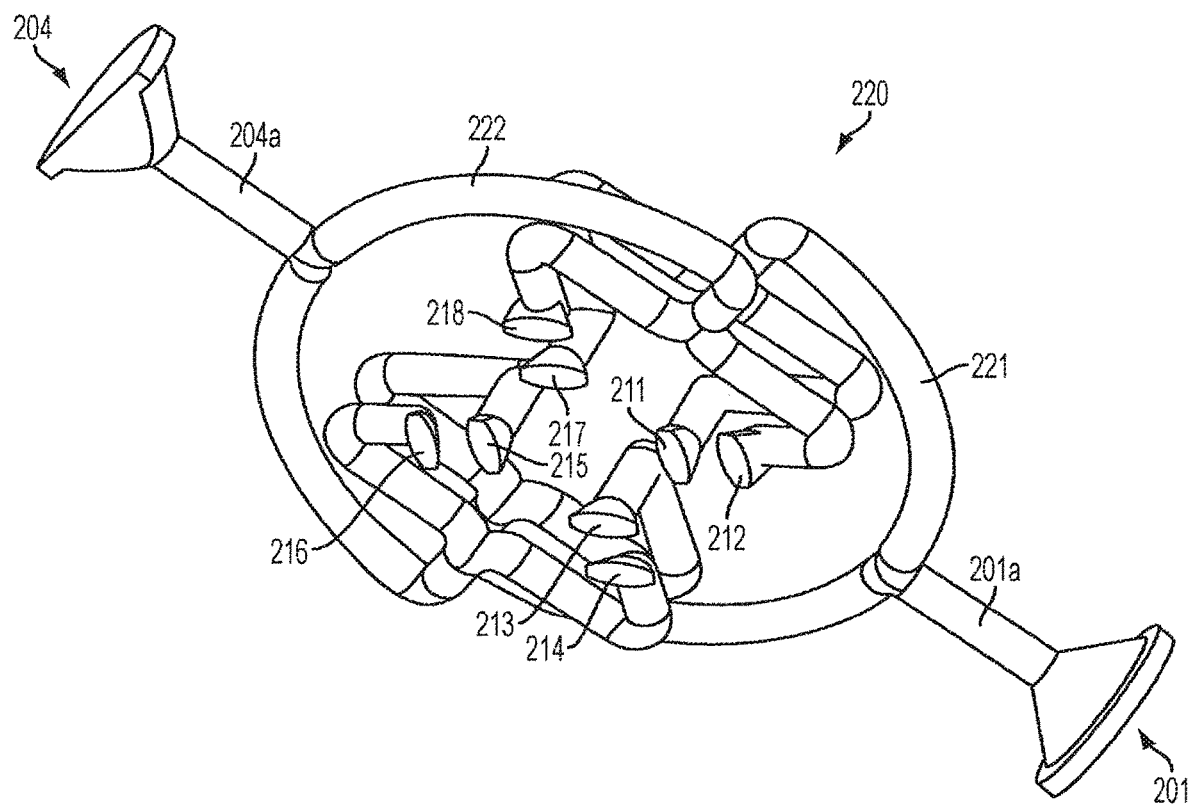
FIG. 5 is a perspective view of one embodiment of an input distribution module of the system shown in FIG. 4.

Referring to FIG. 5, the distribution module 220 is configured to receive incoming stream(s) 201a, 204a of materials 201, 204 and divide the input streams 201a, 204a into eight (8) capillary flow streams, generally referenced by 211-218. A pair of two flow streams will form one of the flow streams 205-208. For example, pair 211, 212 forms flow stream 205 in the example shown in FIGS. 4 and 5.

Figure 6:
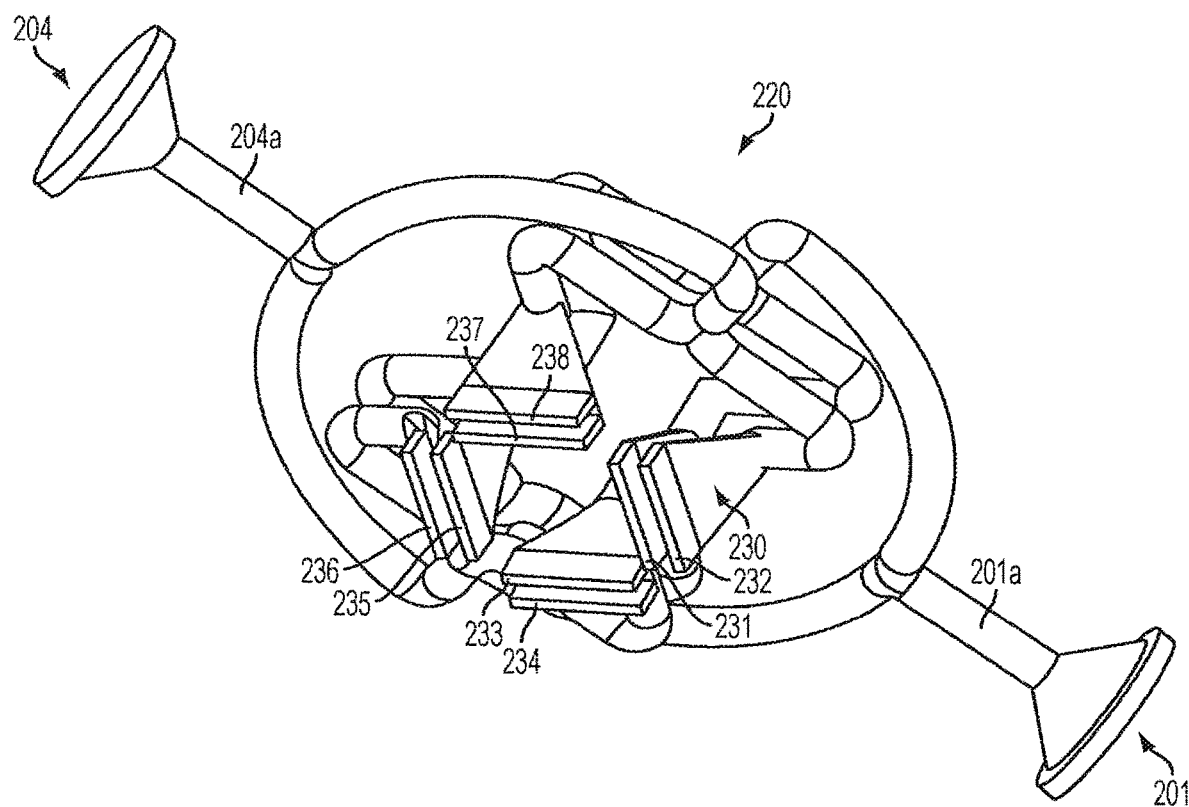
FIG. 6 is perspective view of one embodiment of the input distribution module and a transition module for the system shown in FIG. 4.
Figure 9:
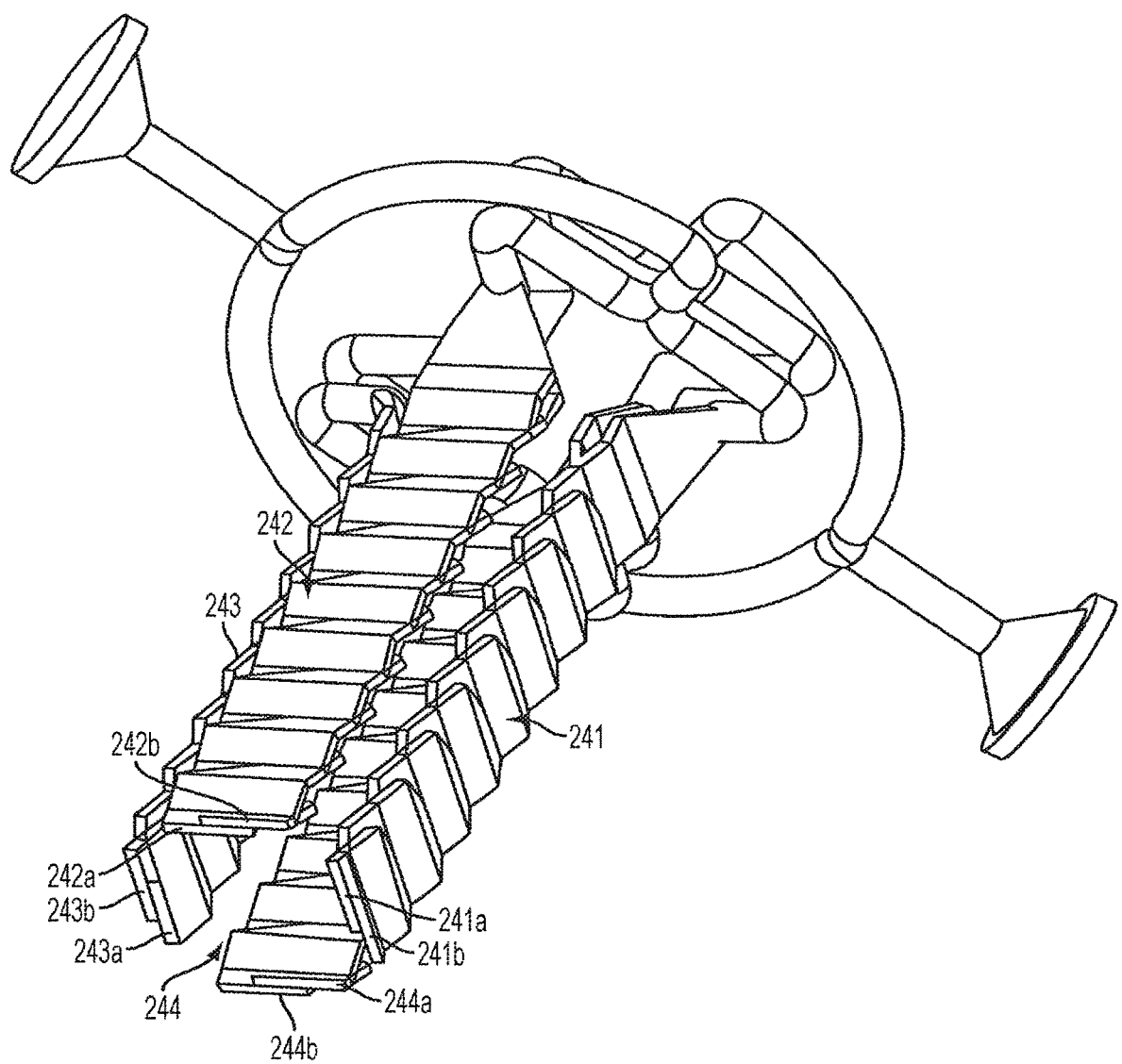
FIG. 9 is a sectional view of the embodiment of FIG. 4 taken along section lines C-C.

Referring to FIG. 6, the transition module 230 is configured to receive the eight capillary streams 211-218 and process them through transition die passages 231-238 to form a group of eight ribbon shaped streams. The eight output ribbons or streams are compressed, combined and supplied to the lamination module 240 for processing in the four laminating flow streams 241-244, as shown in FIGS. 4, 8 and 9. As shown in FIG. 6, each of transition die passages 231-238 is generally shaped to transform the substantially tubular shaped streams from distribution module 220 into substantially rectangular ribbon shapes for further processing. The input flow from the transition module 230 to the lamination module 240 is best shown in FIG. 7.

According to the embodiment shown in FIGS. 4-9, the flow streams 205-209, and corresponding modules 220-250, are configured in a substantially dispersed array 199 having a direction of flow parallel to the central axis X-X of the extrusion die system 200. This configuration is particularly advantageous for the extrusion of tubular shaped products. It also provides a central space 251 for the forming of a substrate (not shown) onto which the tubular output of the laminated flow streams 205-208 may be extruded.

Figure 7:
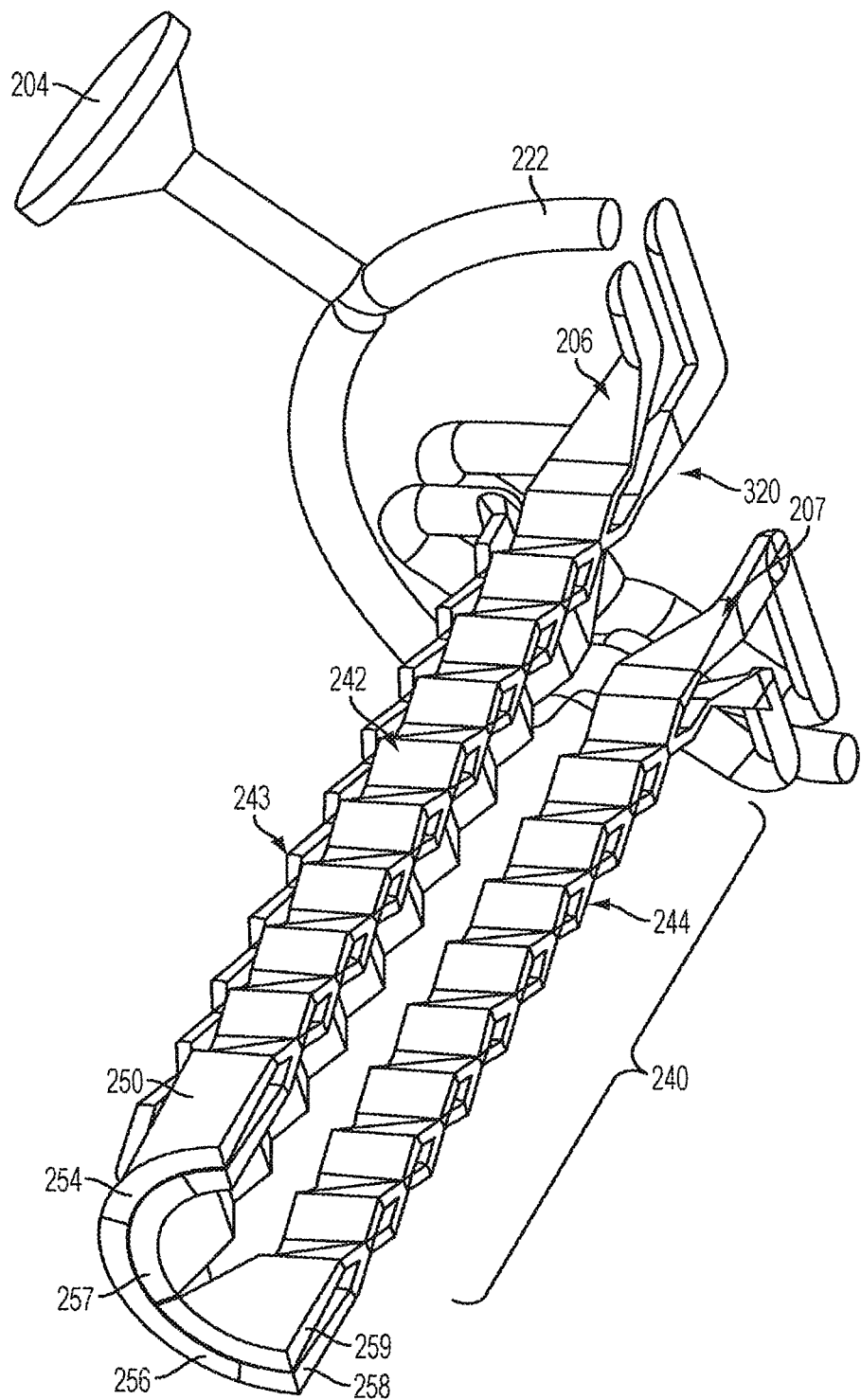
FIG. 7 is a sectional view of the embodiment of FIG. 4 taken along section lines A-A.
Figure 10:
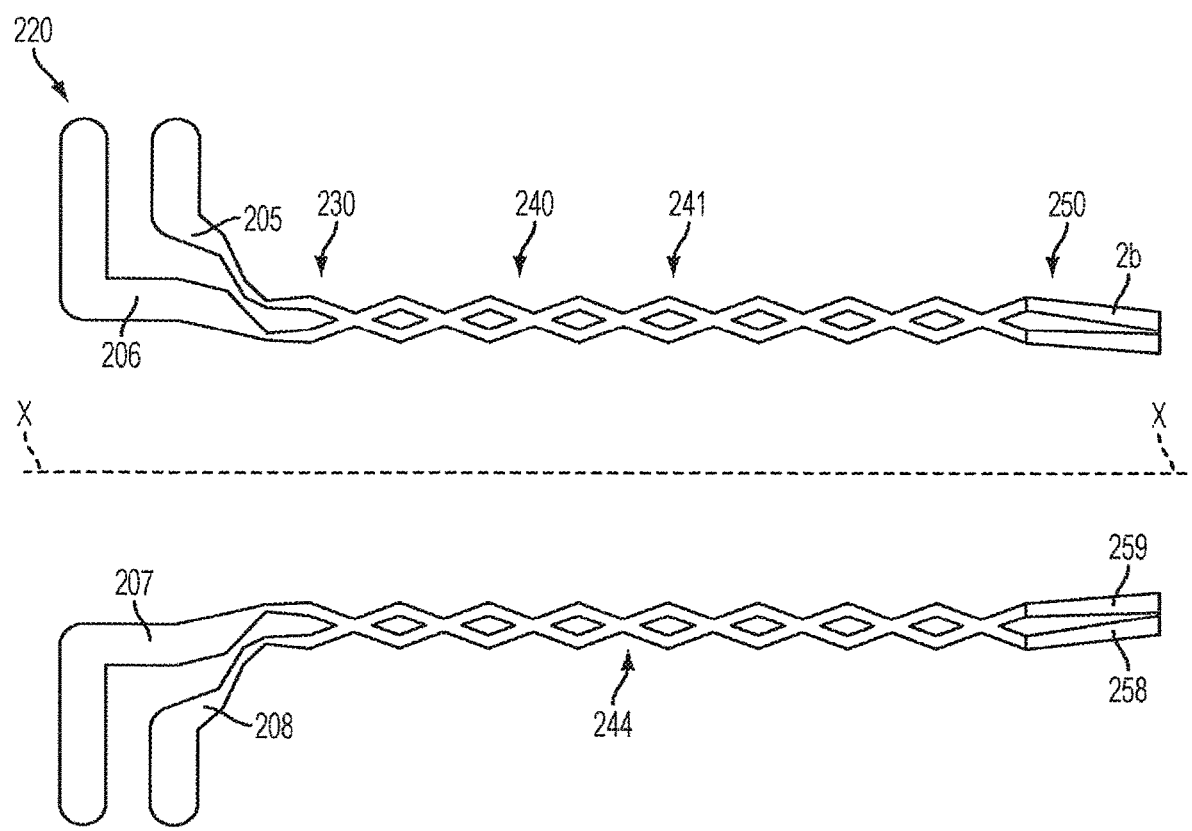
FIG. 10 is a sectional view taken along the center axis of the embodiment shown in FIG. 4.

FIG. 7 illustrates a cut away view along a generally horizontal axial cross section of the laminating module 240, illustrating in particular, the lower flow stream 244. A further cut away view along a vertical cross section is shown in FIG. 8, thereby fully illustrating the overall components of the die system 200 of the embodiment shown and described with reference to FIG. 4. In order to illustrate schematically the division step of each of the laminating steps of laminating module 240, a sectional view, taken in a plane transverse to the axis X-X of FIG. 4 is presented in FIG. 9. In this view the division passages 241a, 241b, 2421, 242b, 243a, 243b and 244a, 244b of the flow passages 241-243 are illustrated. FIG. 10 is a cross-sectional side view of the embodiment shown in FIG. 4.

As shown in FIGS. 4-10, the flow of material in each of the flow passages or streams 205-208 and 241-244, subjects the material to repeated steps of compression, division, and layering until reaching the die exit 250. The flow streams of each group are in the form of laminated ribbons and retain a layered structure corresponding to the number of laminations. This structure is maintained throughout the extrusion process, except for increased numbers of thinner and thinner laminations, the numbers of which are only limited by the particular design and product requirements.

As shown in FIGS. 4-9, the laminating module 240 includes one or more laminating phases or steps in each of the laminating flows 241-244, such as phase 245 in flow 242. At each laminating phase or step within the laminating module 240, the material is compressed, divided and overlapped to multiply the number of laminations. By subjecting the flow of material to a chain of extrusion stages of this construction, exponentially increasing numbers of gradually thinner laminations may be formed within the extrusion flow, thereby obtaining smaller and smaller grain features and eventually obtaining nano-sized features. A computer generated depiction of a preform 300 formed by this process is shown at the die exit 250 in FIGS. 11 and 12.

With reference to FIGS. 7-11, the four parallel laminated flows 241-244 are each split into pairs of inner and outer exit flows, also referred to as exit flow passages or streams. FIGS. 7-8 illustrate aspects of the exit flow pairs 252, 253 for flow passage 241, pairs 254, 255 for flow passage 242, and pairs 256, 257 for flow passage 243 and 258, 259 for flow passage 244.

In one embodiment, referring to FIGS. 4 and 10, each passage 252-259 of the die exit 250 is skewed from the generally parallel direction maintained in flow streams 241-244 at a predetermined helical pitch angle to the axis X-X. In this manner a tubular shape may be formed from the output. FIG. 10 illustrates one embodiment of the angled configuration of the exit flow passages or streams 254, 255, 258 and 259.

Figure 11:
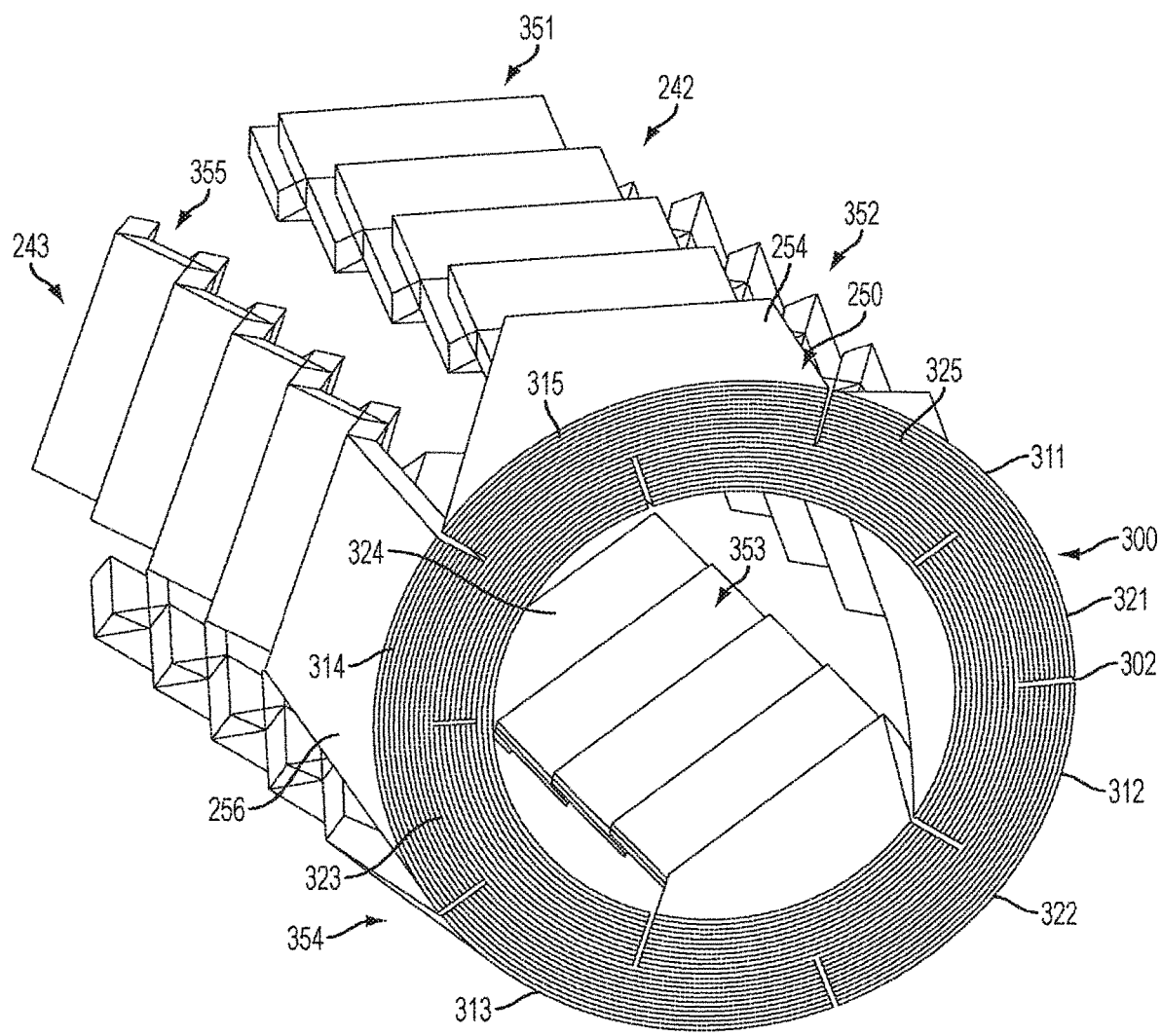
FIG. 11 is a perspective view of the preform at the die exit in the embodiment of FIG. 4.
Figure 12:
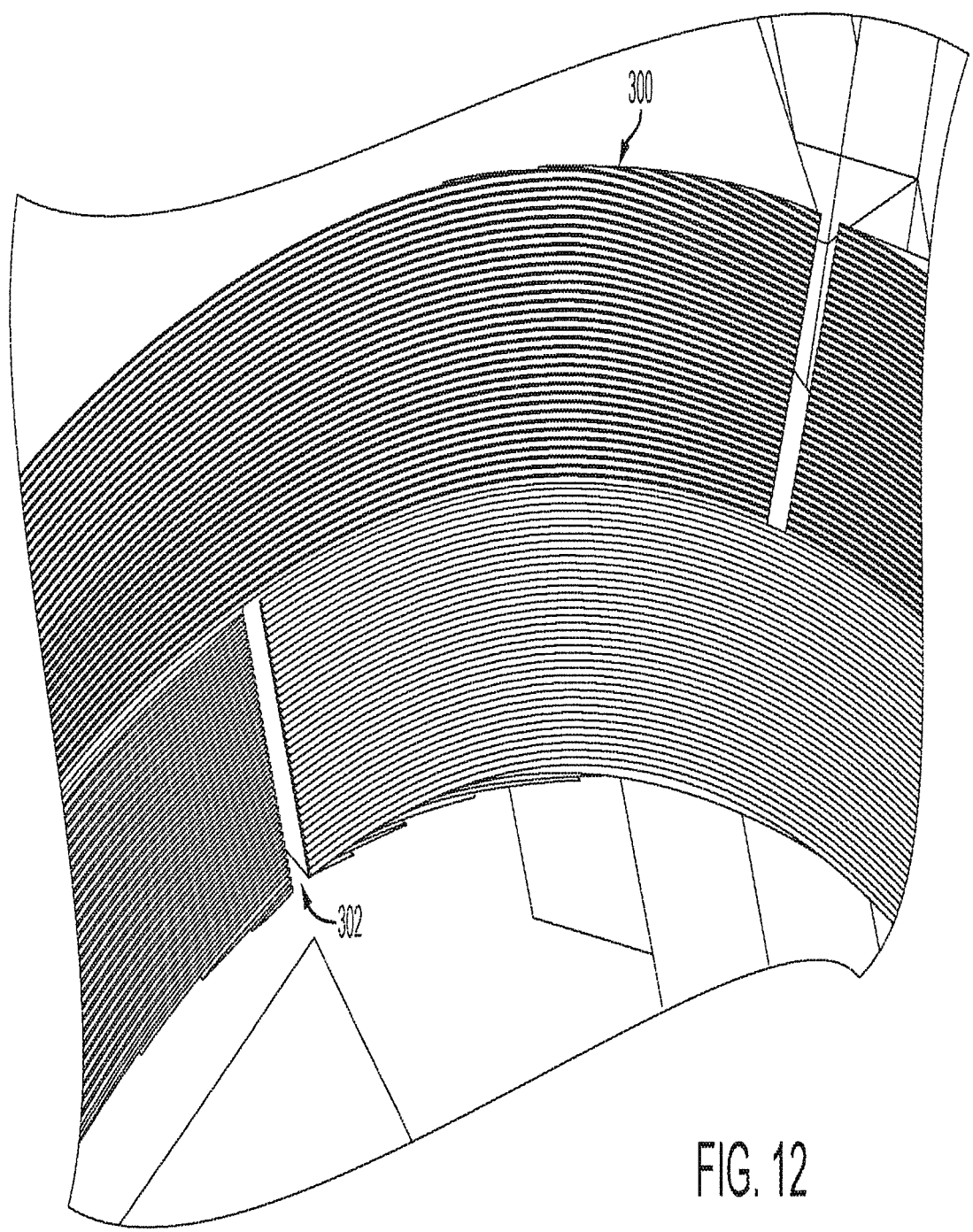
FIG. 12 is an enlarged view of a portion of the preform of FIG. 13.

FIG. 11 illustrates an embodiment with five flow streams 351-355. The exit passages 311-315 and 321-325 form a total of ten (10) annular segments that are the result of the ten laminated streams. In this example, the output of each of the inner and outer pairs of exit flow passages/streams 311-315 and 321-325 are combined to form a single output preform 300 at die exit 250, as illustrated, in exaggerated size. Because of the joining of the ten resulting laminated streams from the passages 311-315 and 321-325, the output perform 300 will have distinct boundary features 302 as shown in FIGS. 11 and 12. Although these boundary features 302 will be microscopic in nature, they may cause weakness in the overall tubular product. To avoid this and to provide an integrated tubular perform shape, in one embodiment, the die exit 350 is constructed to reshape the ribbon shaped streams received from the laminating module 240 into annular segments including outer annular segments 311-315 and inner annular segments 321-325, as shown in FIG. 11.

In one embodiment, as is shown in FIGS. 11 and 12, the inner 311-315 and outer 321-325 annular segments may be offset so that the boundary features 302, also referred to herein as "seams", formed during joining of the flow streams are not aligned, or are staggered. The overlapping and staggering of the seams 302 makes for a much stronger end product because the contact area is increased. The "weld" is substantially arc shaped, where the load has much more surface area and the load is in shear. In alternate embodiments, the boundary features 302 can be aligned. In one embodiment, the boundary features or seams 302 can be aligned and butt-welded together. This configuration can be advantageous when it is desirable to embed a material or substance between the seams 302. FIG. 11 illustrates a staggered arrangement of seams 302 that are joined together using a suitable bonding mechanism.

Figure 13:
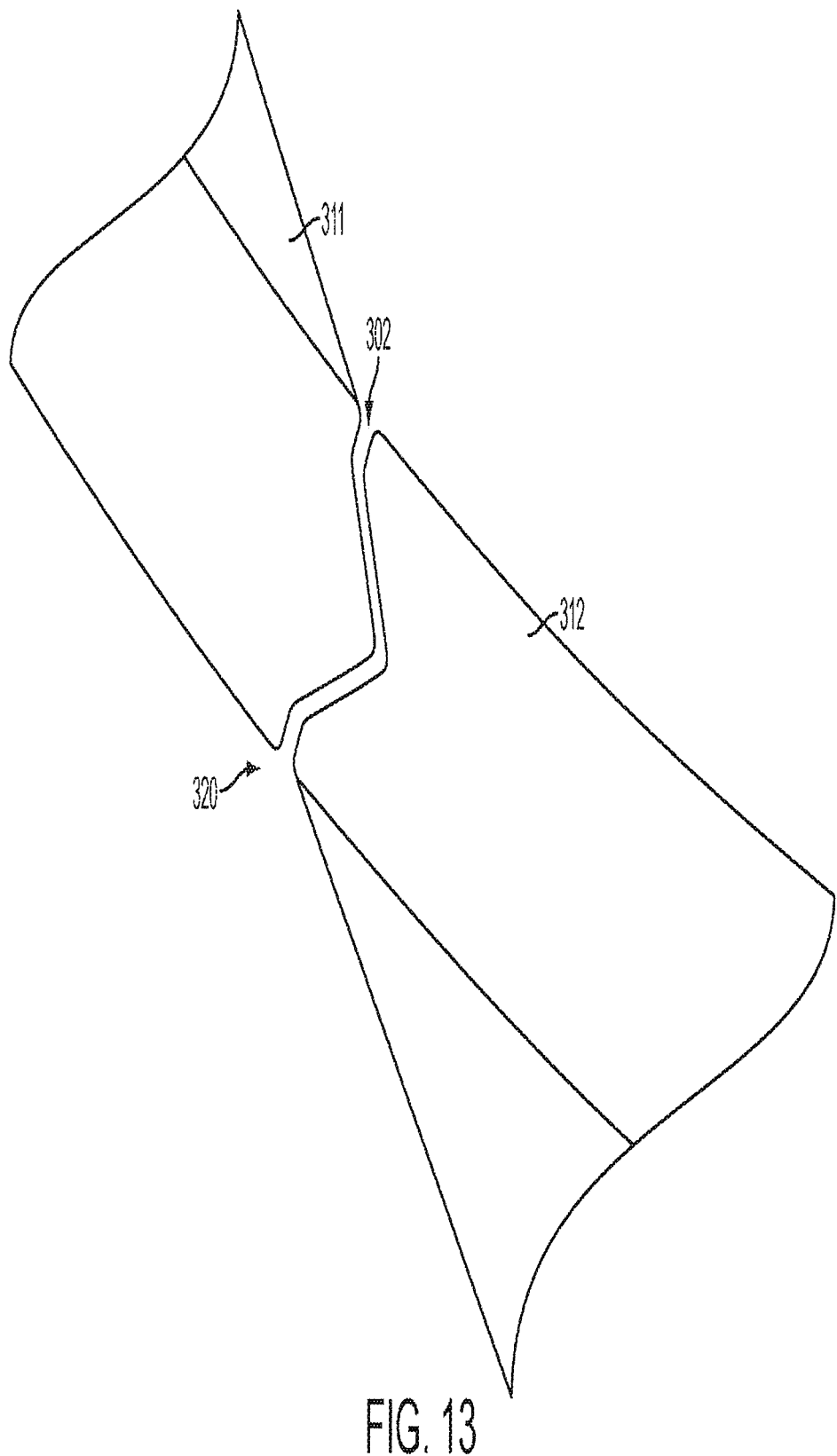
FIG. 13 illustrates a tongue and groove bonding seam for the preform of FIG. 11.

In one embodiment, referring to FIG. 13, a bonding mechanism, such as for example a tongue and groove bonding mechanism or pattern 320, can be applied to each of the boundary features 302 between adjacent segments, such as 311, 312. This can help in improving the continuity of the seam as well as the strength.

The aspects of the disclosed embodiments form a tubular product that combines integrated laminated streams having small size grain features and helical grain orientation. The tubular product that is produced by the die extrusion system 200 of the disclosed embodiments exhibits superior strength characteristics and flexibility. While a tubular structure is generally referred to herein, the processes and apparatus of the disclosed embodiments provide significant latitude to design a wide variety of structures not limited to tubular shapes and configurations, but adaptable to many different shapes.

Figure 14:
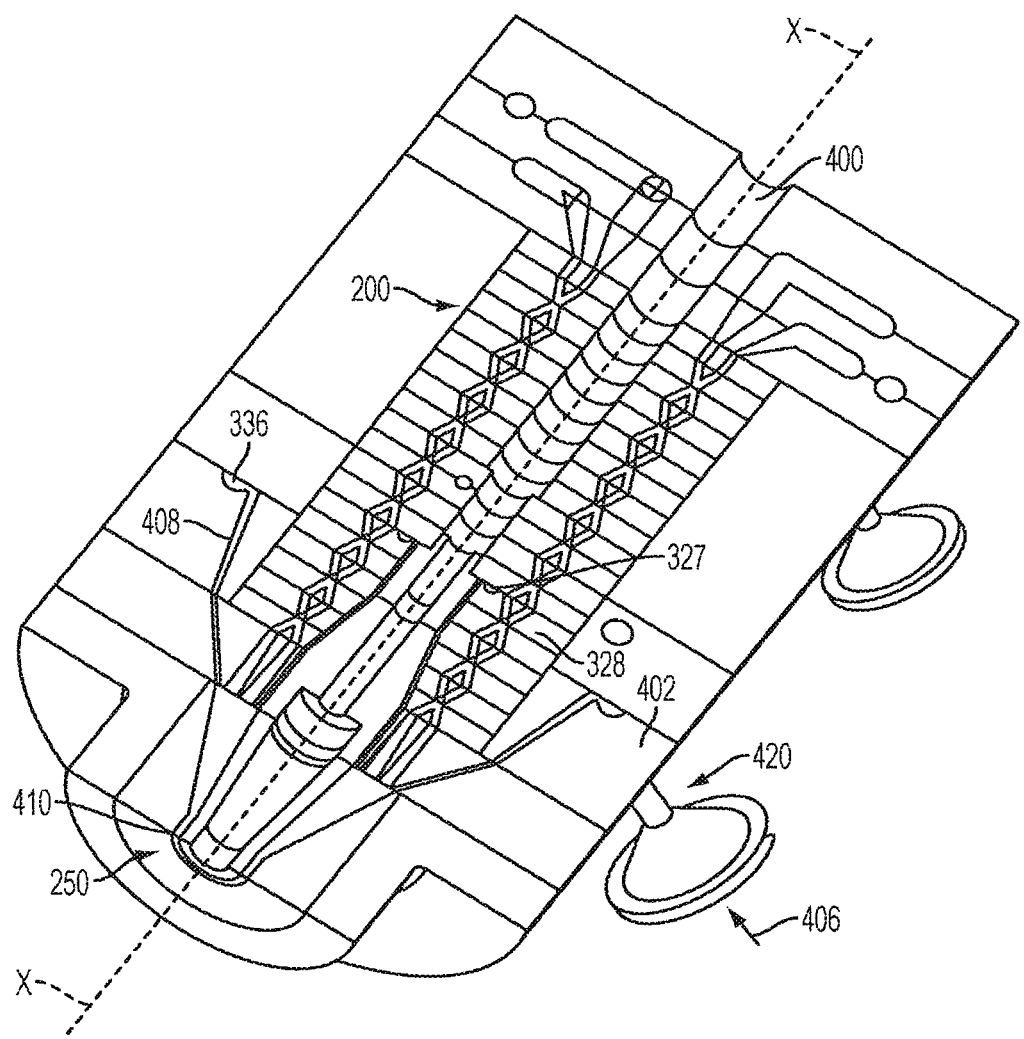
FIG. 14 illustrates an alternate embodiment of the present disclosure illustrating a system of die plates arranged to apply a laminated coating over a tubular substrate.

Referring to FIG. 14, the arrangement of flow paths as shown in FIG. 4 and other embodiments provides space along the axis of the die system 200 for the installation of a central die passage 400 aligned with the axis X-X in conjunction with an extrusion die system 200 incorporating aspects of the disclosed embodiments. FIG. 14 shows an embodiment having an axial die passage 400 through which a tubular substrate 402 of a material 406 may be passed. The passage 400 may be supplied by an independent source of material 406 (which in one embodiment can comprise one or more of the sources 201, 204 shown in FIG. 4) and conveyed to the passage 400 in a balanced flow groove 408 constructed in die plate 402. This allows the application of the output laminated flow 410, created in accordance with the aspects of the extrusion die system 200 disclosed herein, to a tubular substrate at the die exit 250.

Figure 15:
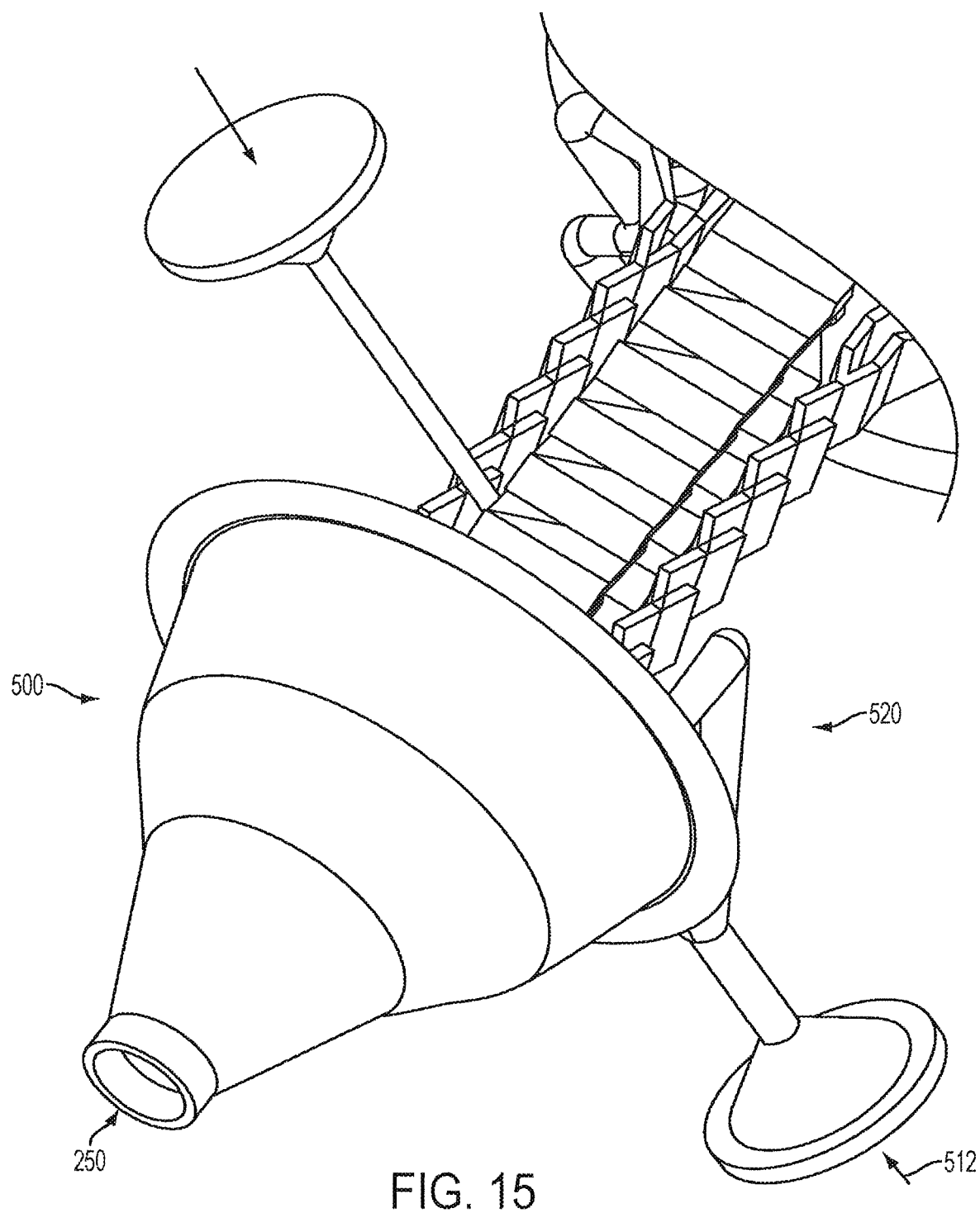
FIG. 15 is perspective view of an second alternative embodiment of the present disclosure illustrating a die system arranged to apply a laminated coating over a tubular substrate and an outer coating to the laminated coating.
Figure 16:
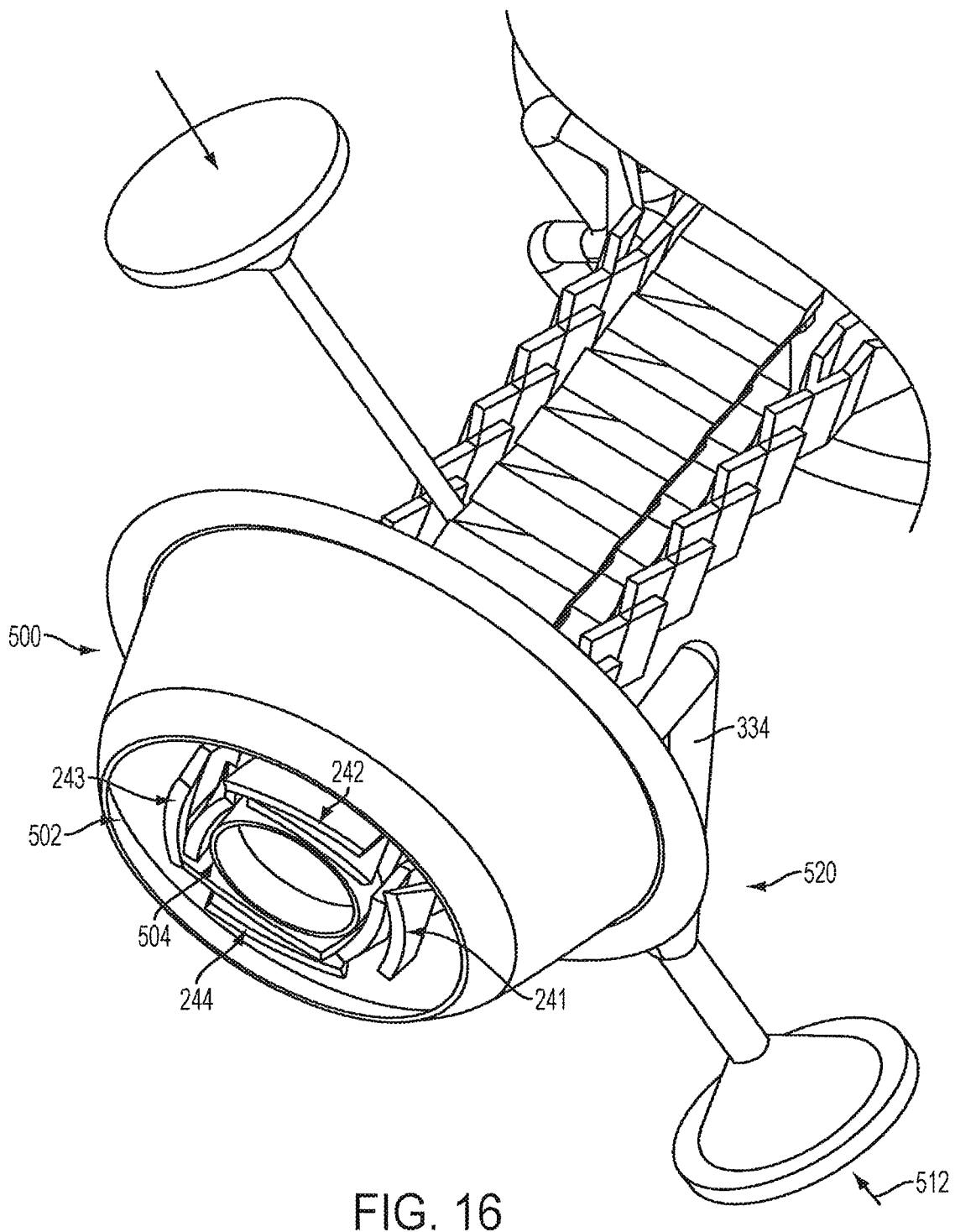
FIG. 16 is a perspective view of the embodiment of FIG. 15, partially cut away upstream of the die output, illustrating the relationship among the passages for the tubular substrate, the laminated coating and the outer coating.
Figure 17:
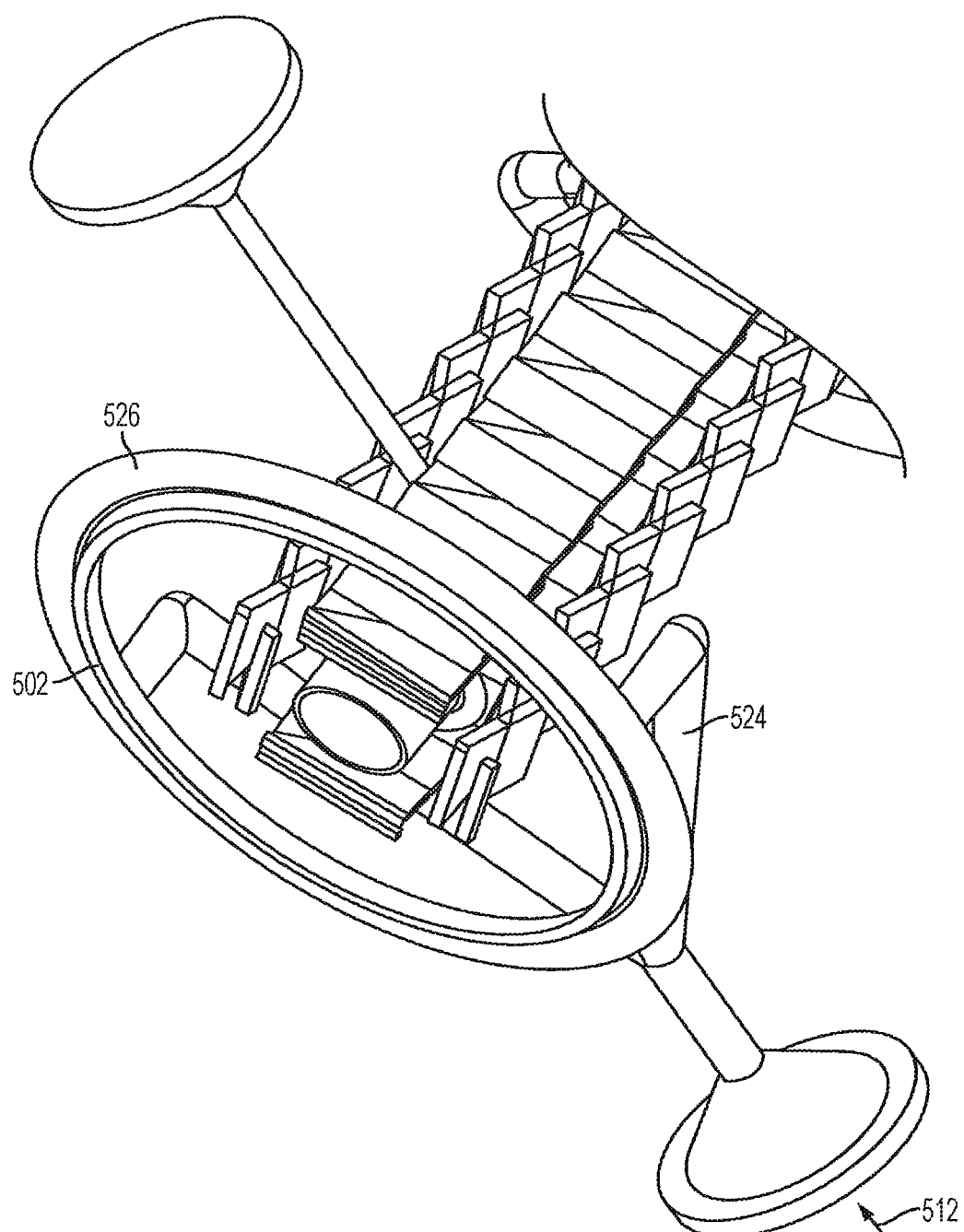
FIG. 17 is a perspective view of the embodiment of FIGS. 15 and 16, partially cut away further upstream of the die output, to show the distribution module for the outer coating.
Figure 18:
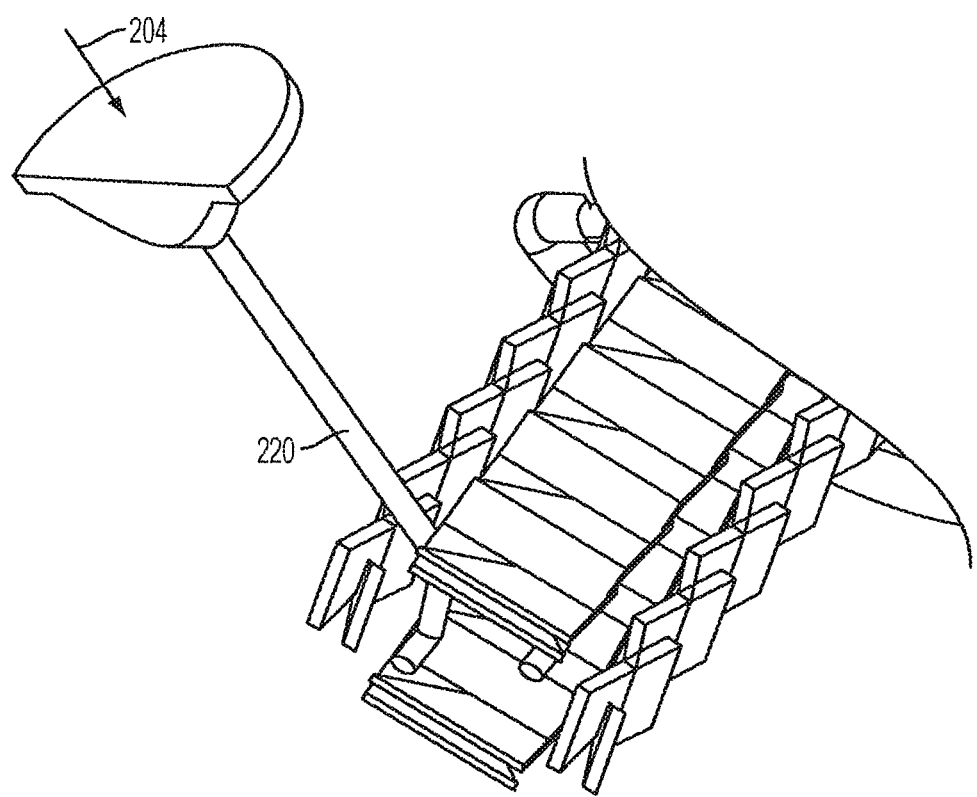
FIG. 18 is a perspective view of the embodiment of FIGS. 15, 16 and 17, partially cut away still further upstream of the die output, to show the distribution module for the tubular substrate.

A second alternate embodiment is described with reference to FIGS. 15 and 16. In this embodiment, the die exit 250 is surrounded by a die element 500 having a conical die passage 502 for extruding an outer coating of a material 512 over the laminated output. Although the outer die passage 502 may be constructed in the absence of a tubular substrate passage 504, both passages 502 and 504 are shown in FIG. 16. FIG. 16 illustrates the relative position of substrate passage 504, laminated flow streams 241-244 and outer die passage 502 in a cut away view taken upstream of the die exit 250. A further illustration showing the distribution module 520, similar to distribution module 220 of FIG. 4, that feeds the outer die passage 502 is contained in FIG. 17. As shown in FIG. 17, the distribution module 520 is comprised of input passages 524 connected to a balanced groove 526. In this embodiment, it is possible to construct a tubular product having a tubular substrate of a first material, a laminated tubular component constructed of a composite of second and third materials and an outer coating of a fourth material. This advantageously provides a significant range of design latitude.

Several aspects and further embodiments of the die system 200 of this application are illustrated in FIGS. 19-23 in which embodiments are shown constructed having different arrays of flow passages or streams, different boundary alignments, resulting in different flow outputs.

Figure 19:
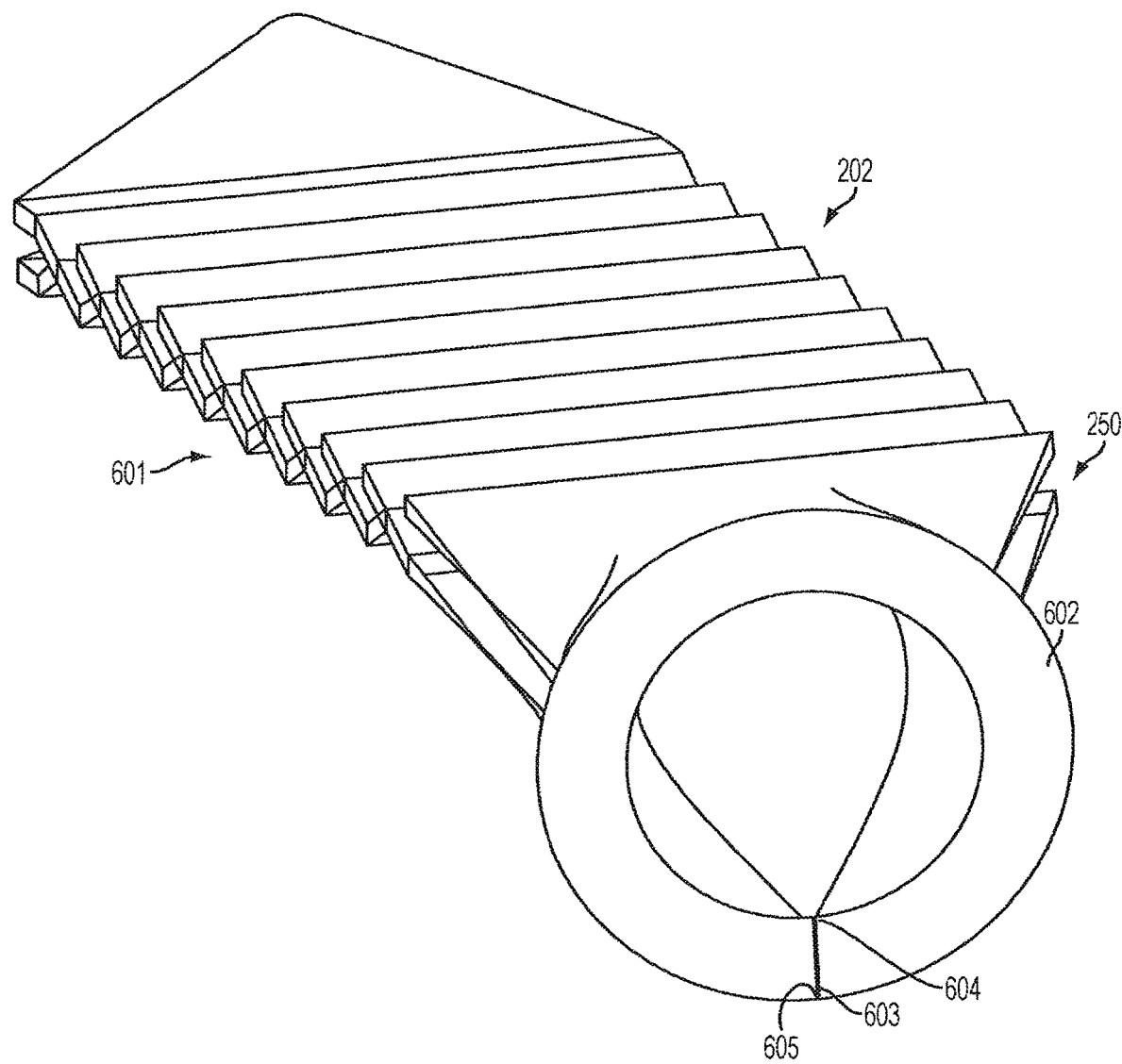
FIGS. 19-25 are perspective views of alternate embodiments of the present disclosure illustrating different numbers and configurations of flow passages and output streams.

FIG. 19 illustrates a configuration processing and outputting a single flow stream 601 from the set of dies 202. The output 602 from the die exit 250 includes a boundary or seam 603. In this example, the boundary or seam 603 results from joining each end 604, 605 of the flow output 602 together.

Figure 20:
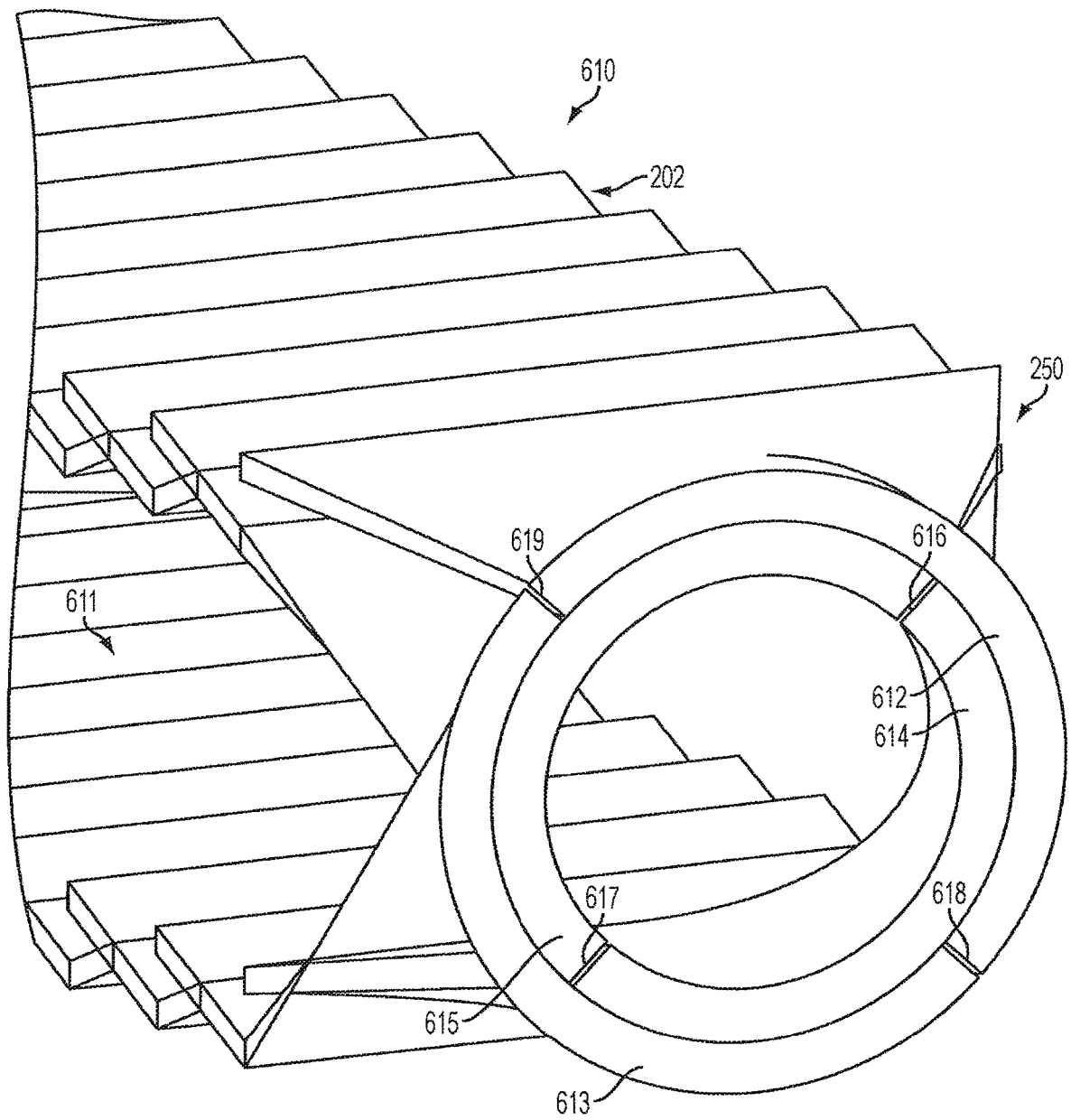

FIG. 20 illustrates the result of the processing of two flow streams or micro-layer channels 610, 611 that are configured or offset approximately 180 degrees apart. In this example, the processing of each flow stream 610, 611 by the system 200 described herein results in outer annular segments 612, 613 and inner annular segments 614, 615. The seams 616-619 are staggered and bonded together.

Figure 21:
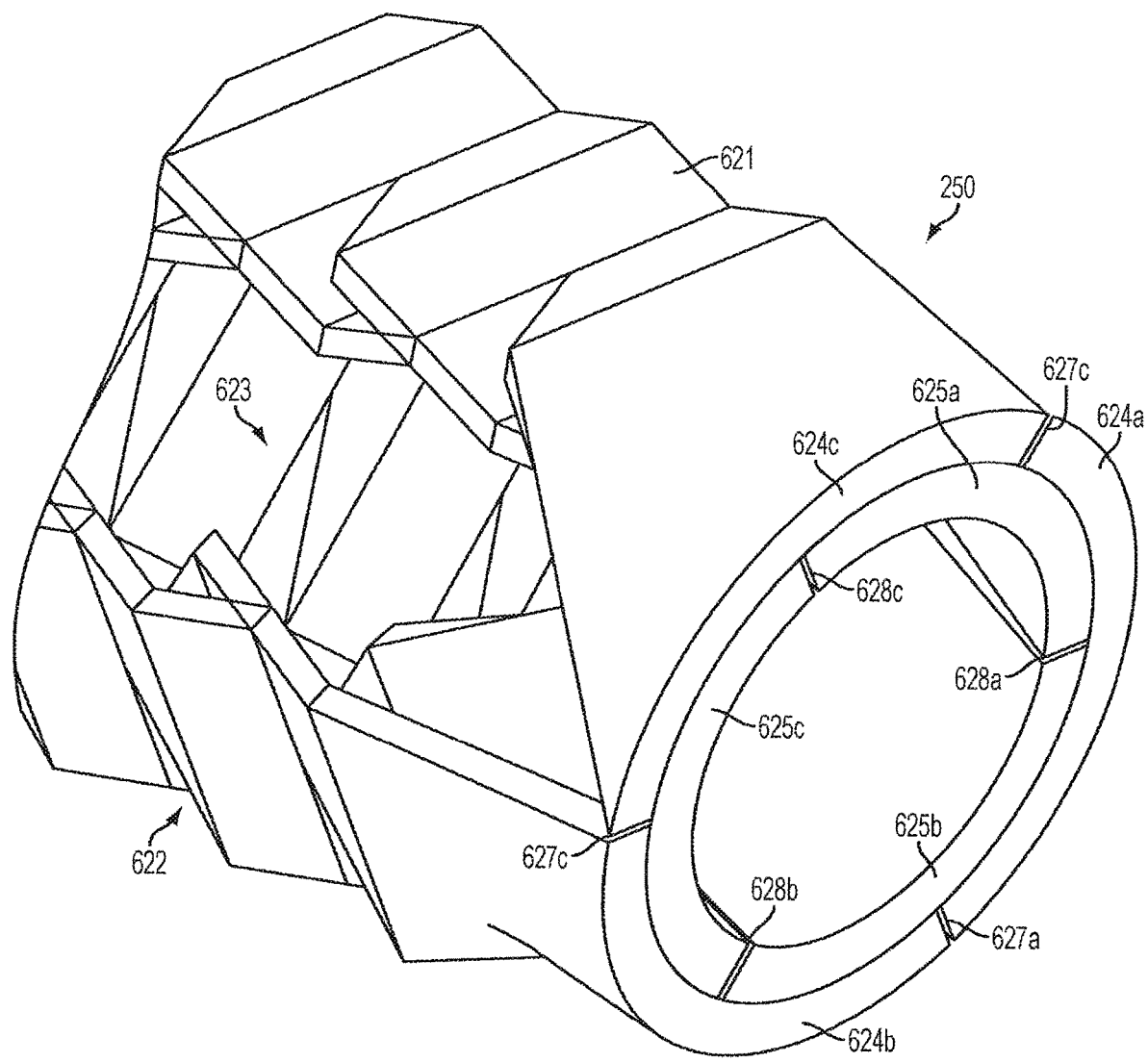

FIG. 21 illustrates three micro-layer channels 621-623 oriented at approximately 120 degrees apart or offset relative to the central axis. This configuration results in outer annular segments 624a-c and inner annular segments 625a-c, and staggered seams 627a-c and 628a-c.

Figure 22:
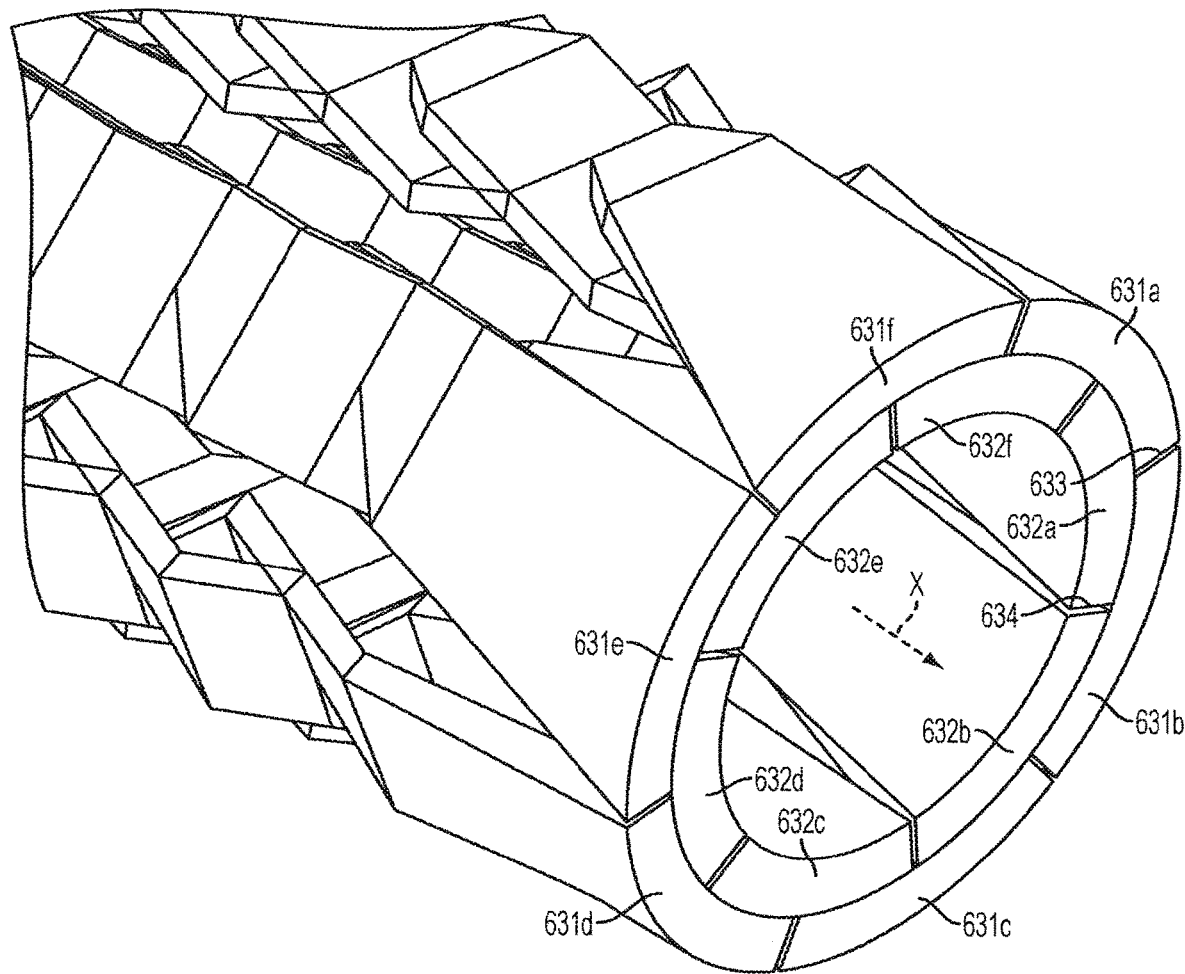

FIG. 22 illustrates annular segments 631a-f and 632a-f resulting from an arrangement of six flow streams in six micro-layer channels configured at an offset of approximately 60 degrees relative to or around an axis of the central channel X-X. In this example, the respective seams 633 and 634 are staggered.

Figure 23:
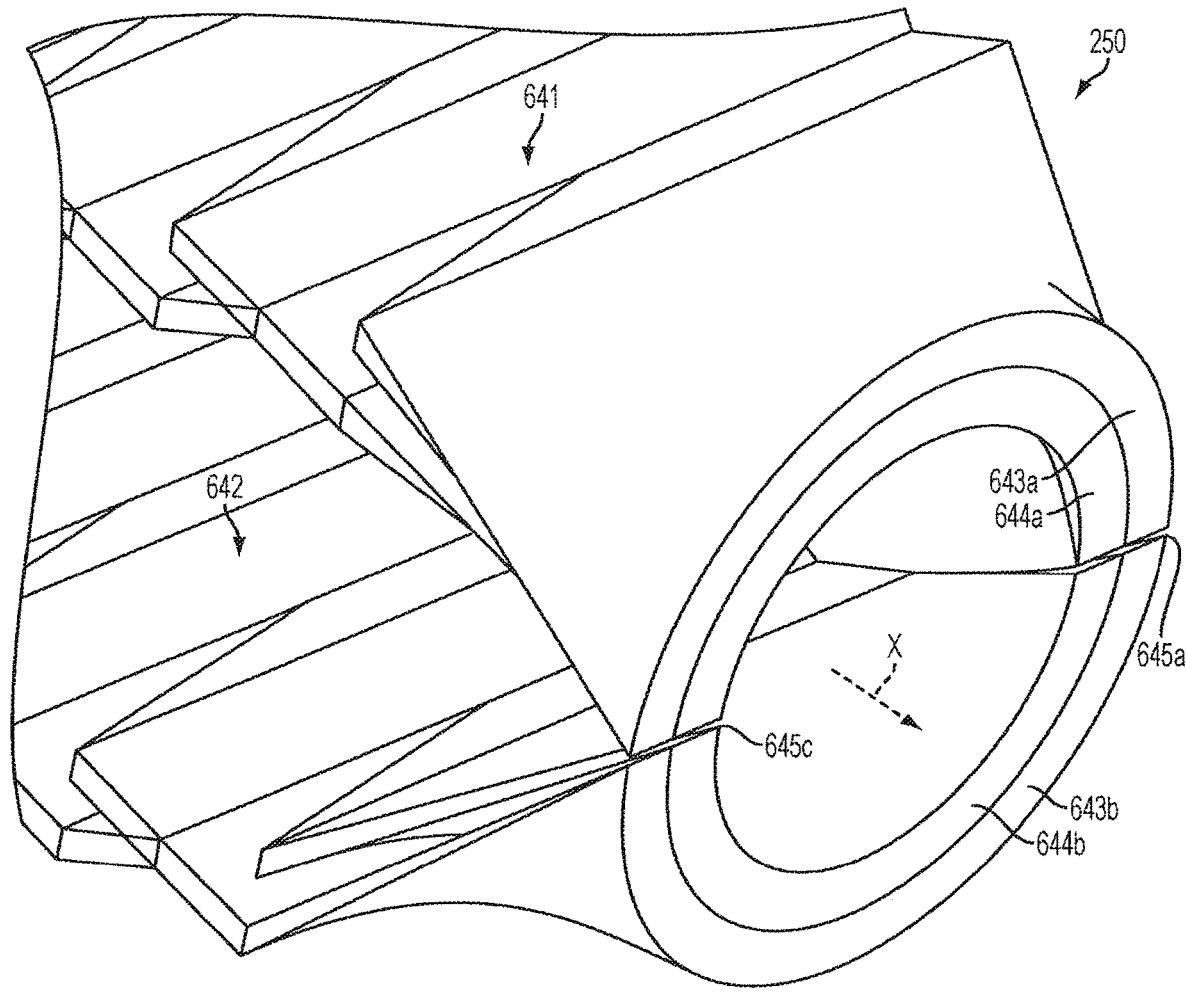

FIG. 23 illustrates annular segments 643a, b and 644a, b resulting from the processing of two flow streams in two micro-layer channels 641, 642 that configured or offset at approximately 180 degrees relative to one another around the central axis X-X. In this example, the boundaries or seams 645a and 645b are not offset, but rather aligned with each of the respective inner and outer exit flow pairs. In this example, the seams 645a and 645b are butt-welded together.

Figure 24:
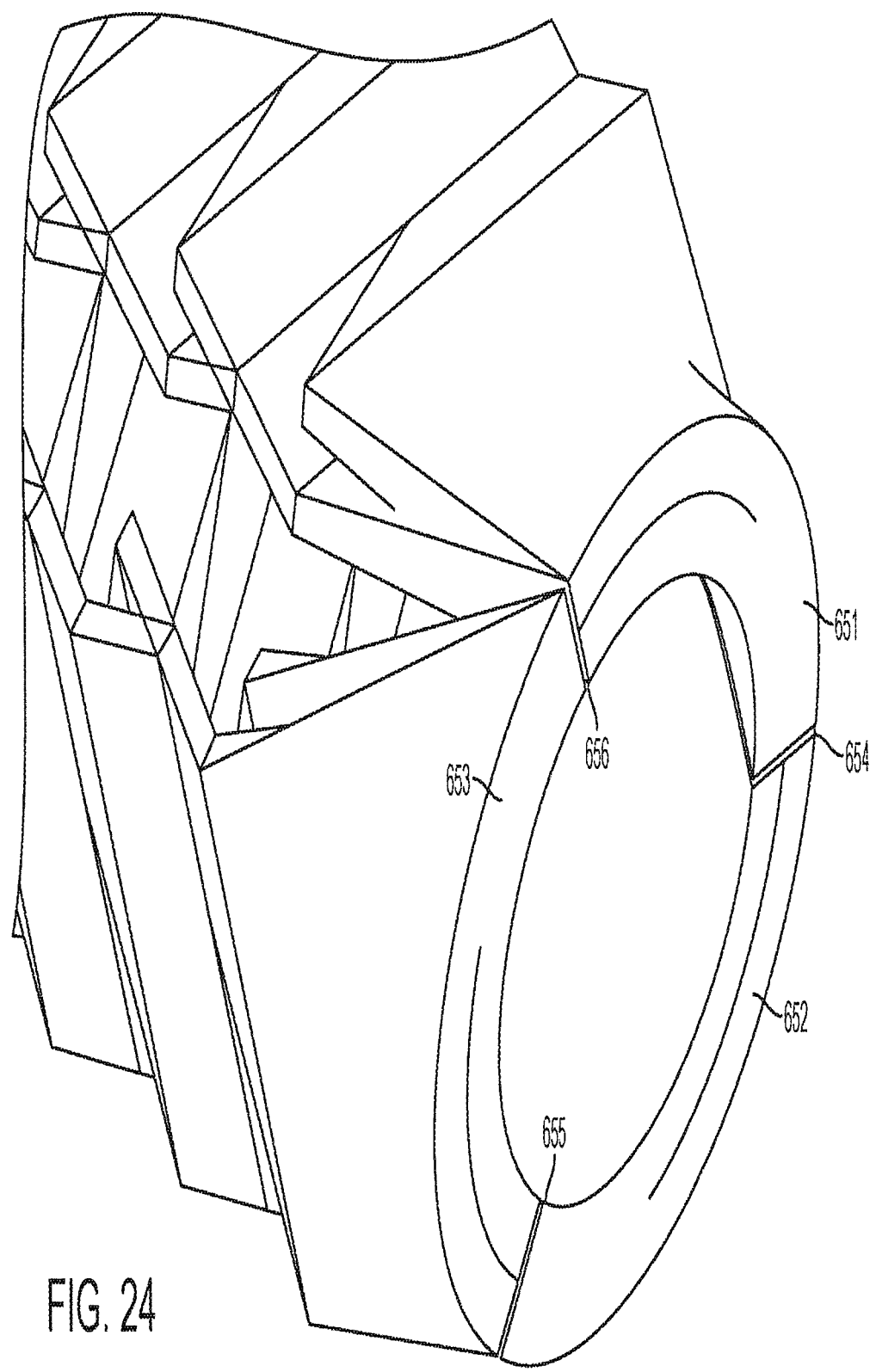

In FIG. 24, three micro-layer channels offset at approximately 120 degrees relative to one another around the central X-X produce inner and outer annular segments generally referred to as 651-653, with aligned and butt-welded seams 654-656.

Figure 25:
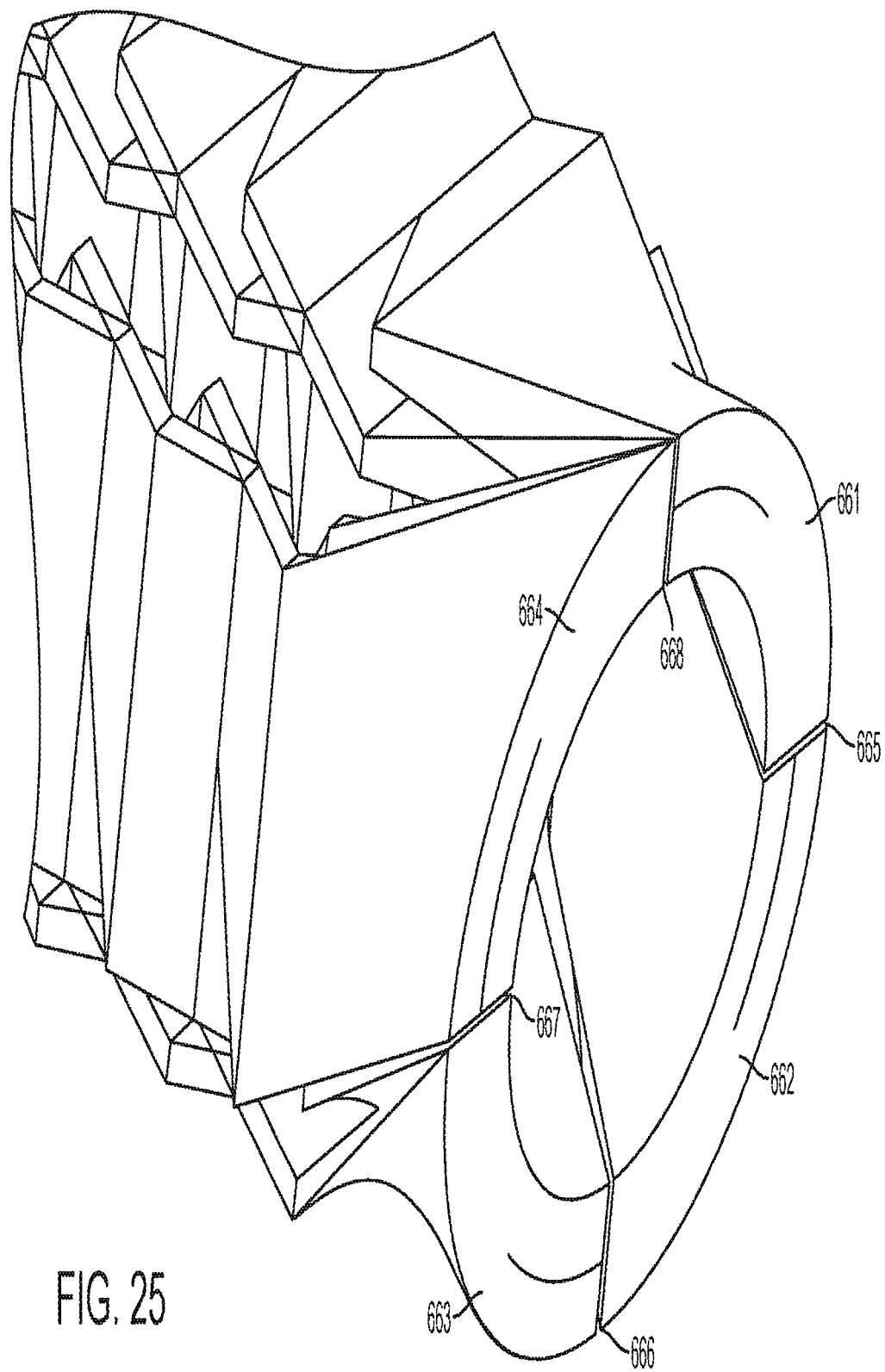

In FIG. 25, four micro-layer channels offset at approximately 90 degrees relative to one another around the central X-X produce inner and outer annular segments generally referred to as 661-664, with butt-welded seams 665-668.

These embodiments are presented as examples of the many configurations possible utilizing the basic elements described herein and further demonstrate the significant design flexibility provided by the aspects of the present disclosure described herein.

Figure 26:
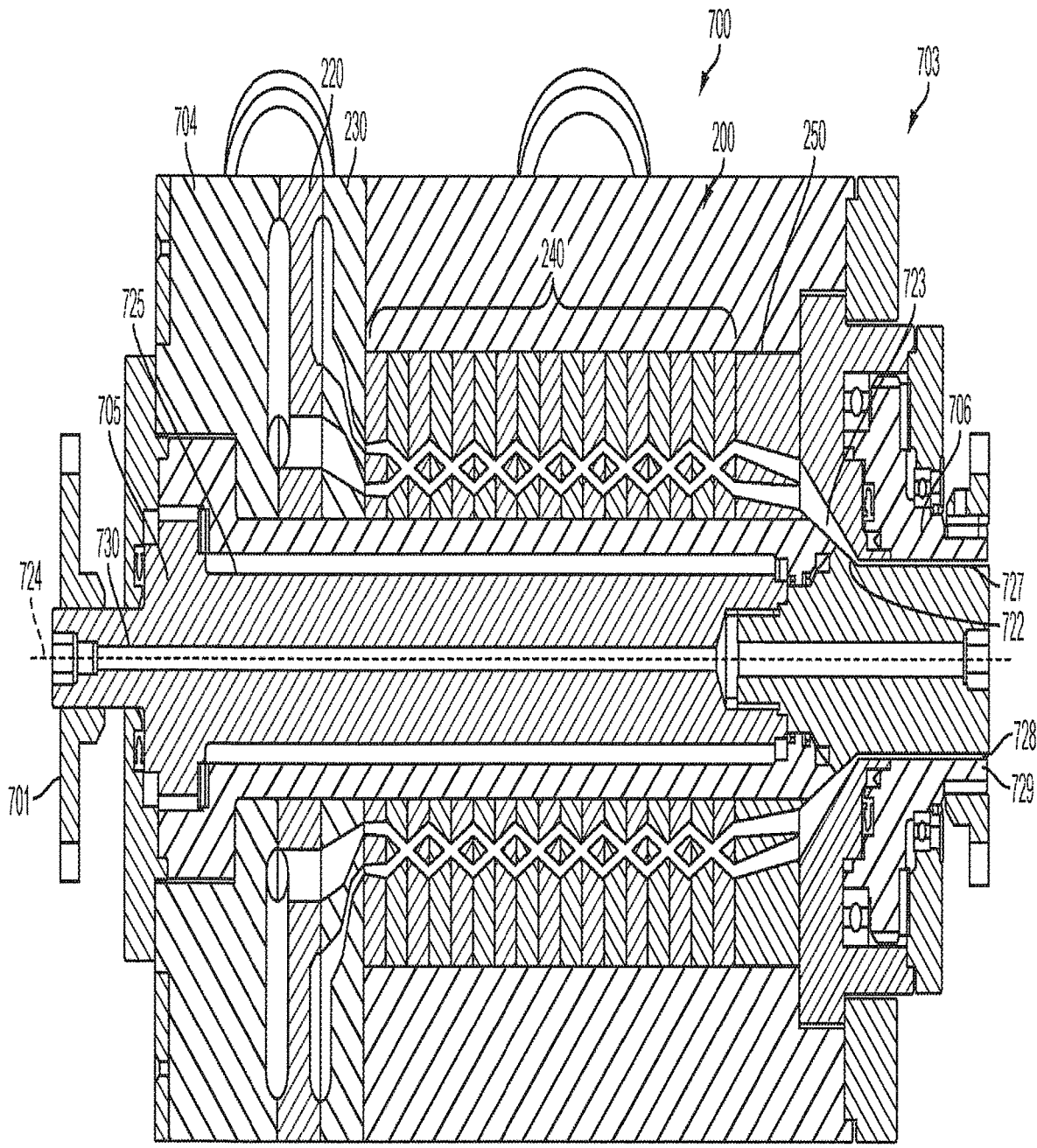
FIG. 26 is an alternate embodiment of the present disclosure illustrating the use of the extrusion die system and assembly of FIG. 4 incorporated into a rotating die assembly

FIG. 26 illustrates one embodiment of the present disclosure where the extrusion die system 200 shown in FIG. 4 is incorporated with rotating components to create a rotary die assembly 700. As shown in FIG. 26, the feedblock for the rotary extrusion die system 700 is internal to the system 700. There is no external feedblock. By the time the product created by the individual die exit 250 of the extrusion system 200 is introduced into the rotating components of the rotating extrusion die assembly 700, the product is already in the form of a tube, which is advantageous. In one embodiment, the rotating aspect of the system 700 takes the tubular product formed by the extrusion system 200 and twists it, potentially eliminating any weld lines or seams 302 entirely, which is advantageous, since the weld line 302 or separation between the microlayers can be a point of weakness.

Figure 3:
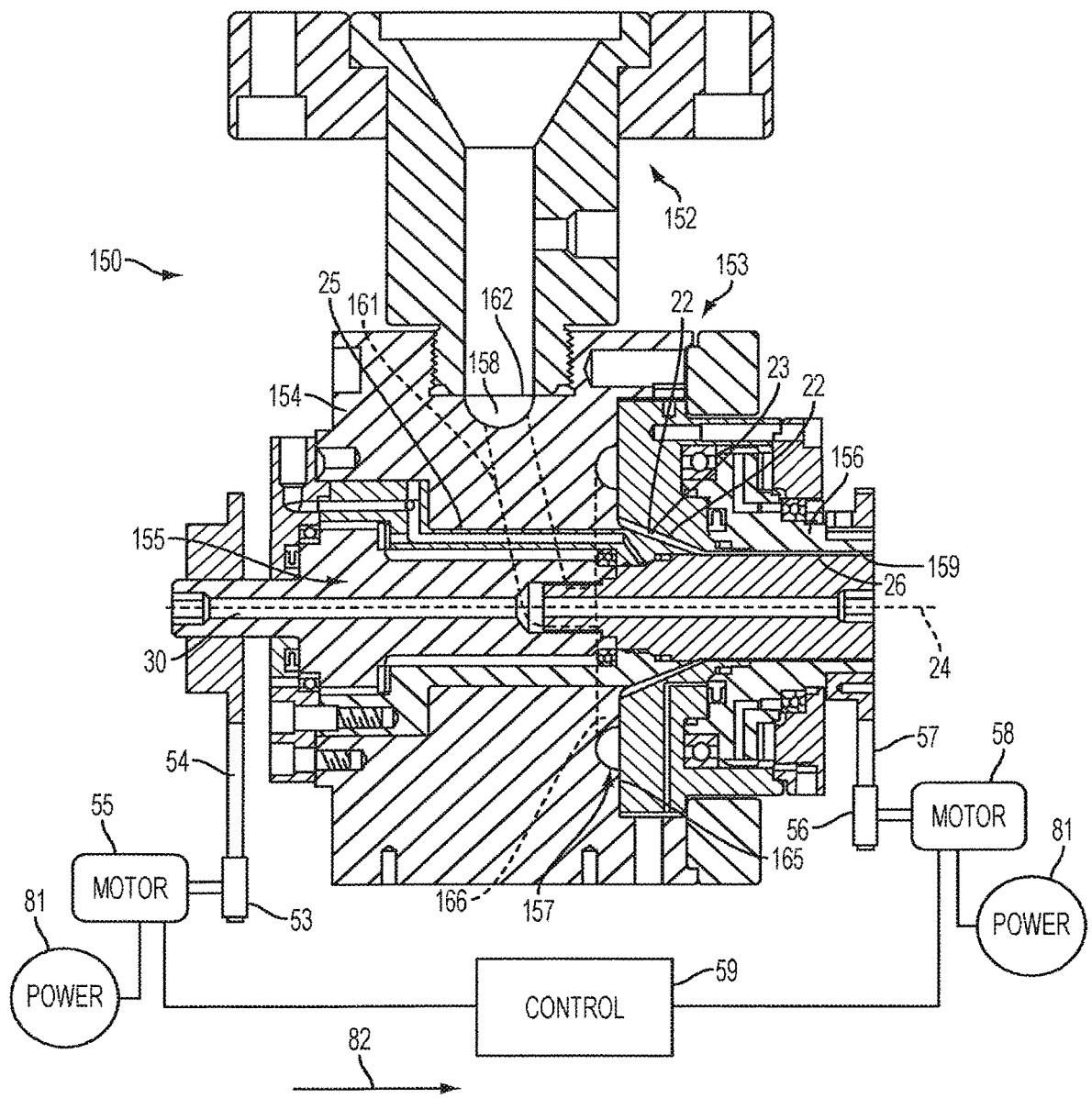
FIG. 3 is a cross-sectional view of one embodiment of an extrusion die assembly having balanced flow passages and rotating elements.

Aspects of the rotating components for the rotary die assembly 700 can be taken from the rotary die assembly 150 shown in FIG. 3. One example of such a rotary die assembly is the rotary die assembly described in commonly owned U.S. Pat. Nos. 6,447,279 and 6,669,458, the disclosures of which are incorporated herein by reference in their entirety.

As is shown in FIG. 26, the extrusion system 700 is constructed to extrude a tubular product constructed of common thermoplastic materials. The system 700 includes a series of components including a die body 704, and a die module 706. The die body 704 and die module 706 are constructed with axially extending bores that align to form a continuous opening 725 along the axis 724 of the assembly 700. A tip module 705 is constructed to fit within the opening 725. A clearance is formed between the inner surface of the bore 725 and the outer surface of the tip 705 to form the extrusion channel portion 723 and the exit portion 727. A conical surface 722 is constructed on the outer surface of the tip module 705 and cooperates with a conical portion of the bore 725 to form the tapered extrusion channel 723. The tip 705 may be constructed with an axial bore 730 to allow an elongated element to pass through the die for coating. Aspects of the '458 patent can be utilized to provide relative rotational movement between the surfaces 728 and 729.

In one embodiment, the extrusion die assembly 200 of the present disclosure can be incorporated within an extrusion blow molding system. In this embodiment, the extrusion die assembly 200 is used to provide the cumulated laminated output with nano-sized features in a tubular form to the shaping aspect of an extrusion blow molding system. In this aspect, a more durable tubular blow molding product can be created, which incorporates many of advantages described herein.

The aspects of the disclosed embodiments create small grain products, such as tubular products, without relying on the use of rotating die components. In a rotary die configuration, the aspects of the disclosed embodiments create an array of feedblocks in the extrusion die itself. There is no external feed-block component. By the time the product that is created by the extrusion die system of the disclosed embodiments reaches the rotating components, the product is already in the form of a tube.

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A micro-layer tubular extrusion product, comprising:
one or more solidified ribbon shaped flow streams each including multiple laminated flow streams arranged to flow in parallel, each solidified ribbon shaped flow stream having two ends, the two ends are opposing surfaces that are parallel to the flow stream,
wherein one end of one solidified ribbon shaped flow stream is bonded to the other end of the one solidified ribbon shaped flow stream or an end of another solidified ribbon shaped flow stream to form a bonded one or more solidified ribbon shaped flow streams including a bonded seam where the one solidified ribbon shaped flow stream is bonded to the other end of the one solidified ribbon shaped flow stream or the end of another solidified ribbon shaped flow stream and the bonded one or more solidified ribbon shaped flow streams form the micro-layer tubular extrusion product, the ends of the respective ribbon shaped flow streams which are bonded to the one solidified ribbon shaped flow stream or another solidified ribbon shaped flow stream being the opposing surfaces that are parallel to the flow stream which are adjacent to and in direct contact with one another,
wherein at least one bonded seam is rotated around a central axis of the tubular extrusion product, wherein the central axis is parallel to the flow stream.

2. The micro-layer tubular extrusion product of claim 1, wherein at least one of the multiple laminated flow streams of one or more solidified ribbon shaped flow streams form inner and outer annular segments.

3. The micro-layer tubular extrusion product of claim 2, wherein the bonded adjacent ends of the respective ribbon-shaped flow streams which are bonded to the one solidified ribbon shaped flow stream or another solidified ribbon shaped flow stream of the inner annular segment and the bonded adjacent ends of the respective ribbon-shaped flow streams which are bonded to the one solidified ribbon shaped flow stream or another solidified ribbon shaped flow stream of the outer annular segment are staggered relative to one another.

4. The micro-layer tubular extrusion product of claim 2, wherein each of the inner and outer annular segments are skewed from a parallel direction of the multiple parallel laminated flow streams at a pre-determined helical pitch angle relative to the central axis of the micro-layer tubular extrusion product.

5. The micro-layer tubular extrusion product of claim 2, wherein at least one of one or more solidified ribbon shaped flow streams include at least one micro-layer including micro-sized or nano-sized features.

6. The micro-layer tubular extrusion product of claim 5, wherein the at least one micro-layer comprises an array of micro-layers, each micro-layer being offset from an adjacent micro-layer by a predetermined angle degree around the central axis of the micro-layer tubular extrusion product.

7. The micro-layer tubular extrusion product of claim 5, wherein the at least one micro-layer comprises two micro-layers, each micro-layer being offset from another micro-layer by approximately 180 degrees around the central axis of the micro-layer tubular extrusion product.

8. The micro-layer tubular extrusion product of claim 5, wherein the at least one micro-layer comprises three micro-layers, each micro-layer being offset from another micro-layer by approximately 120 degrees around the central axis of the micro-layer tubular extrusion product.

9. The micro-layer tubular extrusion product of claim 5, wherein the at least one micro-layer comprises four micro-layers, each micro-layer being offset from another micro-layer by approximately 90 degrees around the central axis of the micro-layer tubular extrusion product.

10. The micro-layer tubular extrusion product of claim 5, wherein the at least one micro-layer comprises six micro-layers, each micro-layer being offset from another micro-layer by approximately 60 degrees around the central axis of the micro-layer tubular extrusion product.

11. The micro-layer tubular extrusion product of claim 1, wherein the micro-layer tubular extrusion product is cylindrical.

12. The micro-layer tubular extrusion product of claim 1, wherein the micro-layer tubular extrusion product contains a core or substrate.

* * * * *